United States Patent
Matsuo et al.

(10) Patent No.: US 6,906,705 B2
(45) Date of Patent: Jun. 14, 2005

(54) ELECTRONIC FILE WITH FLEXIBLE DISPLAY MEDIUM

(75) Inventors: Hiroyuki Matsuo, Neyagawa (JP); Tetsuroh Nakamura, Takaraduka (JP); Masaichiro Tatekawa, Minoo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 590 days.

(21) Appl. No.: 09/977,487

(22) Filed: Oct. 16, 2001

(65) Prior Publication Data

US 2002/0055938 A1 May 9, 2002

(30) Foreign Application Priority Data

Oct. 16, 2000 (JP) ........................................ 2000-314637
Jan. 16, 2001 (JP) ........................................ 2001-007963

(51) Int. Cl.[7] .............................. G09G 5/00; G09G 3/34
(52) U.S. Cl. .......................... 345/206; 345/107; 349/89; 434/178; 434/317
(58) Field of Search ................................ 345/204–208, 345/100, 104, 173, 901, 107; 349/86–89; 281/16; 434/178, 317

(56) References Cited

U.S. PATENT DOCUMENTS 5,869,789 A * 2/1999 Reid-Green .............. 178/18.01
6,124,851 A * 9/2000 Jacobson ..................... 345/206
6,154,190 A * 11/2000 Yang et al. .................... 345/94
6,573,880 B1 * 6/2003 Simoni et al. ................. 345/87

FOREIGN PATENT DOCUMENTS

JP          04-355786       12/1992
WO          WO 97/04398     2/1997

OTHER PUBLICATIONS

"Japan Hardcopy'99—Theses" published by The Imaging Society in Japan, See p. 209 to 251.

* cited by examiner

Primary Examiner—Amr A. Awad
(74) Attorney, Agent, or Firm—McDermott Will & Emery LLP

(57) ABSTRACT

The invention has an object to provide an electronic paper file with high operating performance. The electronic paper file is assumed to comprises an electronic paper of an flexible display medium and a cover to which a plurality of electronic papers is attachable. In the invention, the first storage means stores display-data to be displayed on the electronic paper. The first display control means obtains from the first storage means the display-data corresponding to the desired page selected by the page selecting means and then display them on the electronic paper. Accordingly, even if the enormous pages of the electronic paper were not attached to the electronic paper file, the invention can display the whole of mass data such as an encyclopedia or theses data. Therefore, it is possible to improve the operating performance of the electronic paper file.

48 Claims, 30 Drawing Sheets

Fig. 3 DEVICE STRUCTUR OF DISPLAY UNIT OF ELECTRONIC PAPER UNDER THE APPLICATION OF THIS INVENTION

A: DISPLAY SHEET
- A1: POLARIZING PLATE
- A2: BASE FILM
- A3: ITO ELECTRODE (ROW ELECTRODE)
- A4: DISPLAY MEDIUM
- A5: ITO ELECTRODE (COLUMN ELECTRODE)
- A6: BASE FILM
- A7: POLARIZING PLATE

B: LUMINOUS SHEET
- B1: BASE FILM
- B2: ANODE
- B3: INSULATION LAYER
- B4: LUMINOUS MEDIUM
- B5: CATHOD
- B6: BASE FILM

| CONNECTING TERMINAL ID NO. | ORDER FROM COVER SHEET | CONNECTING ORDER ID NO. |
|---|---|---|
| 1 | 1 | C1 |
| 2 | 2 | — |
| 3 | 3 | C2 |
| 4 | 4 | — |

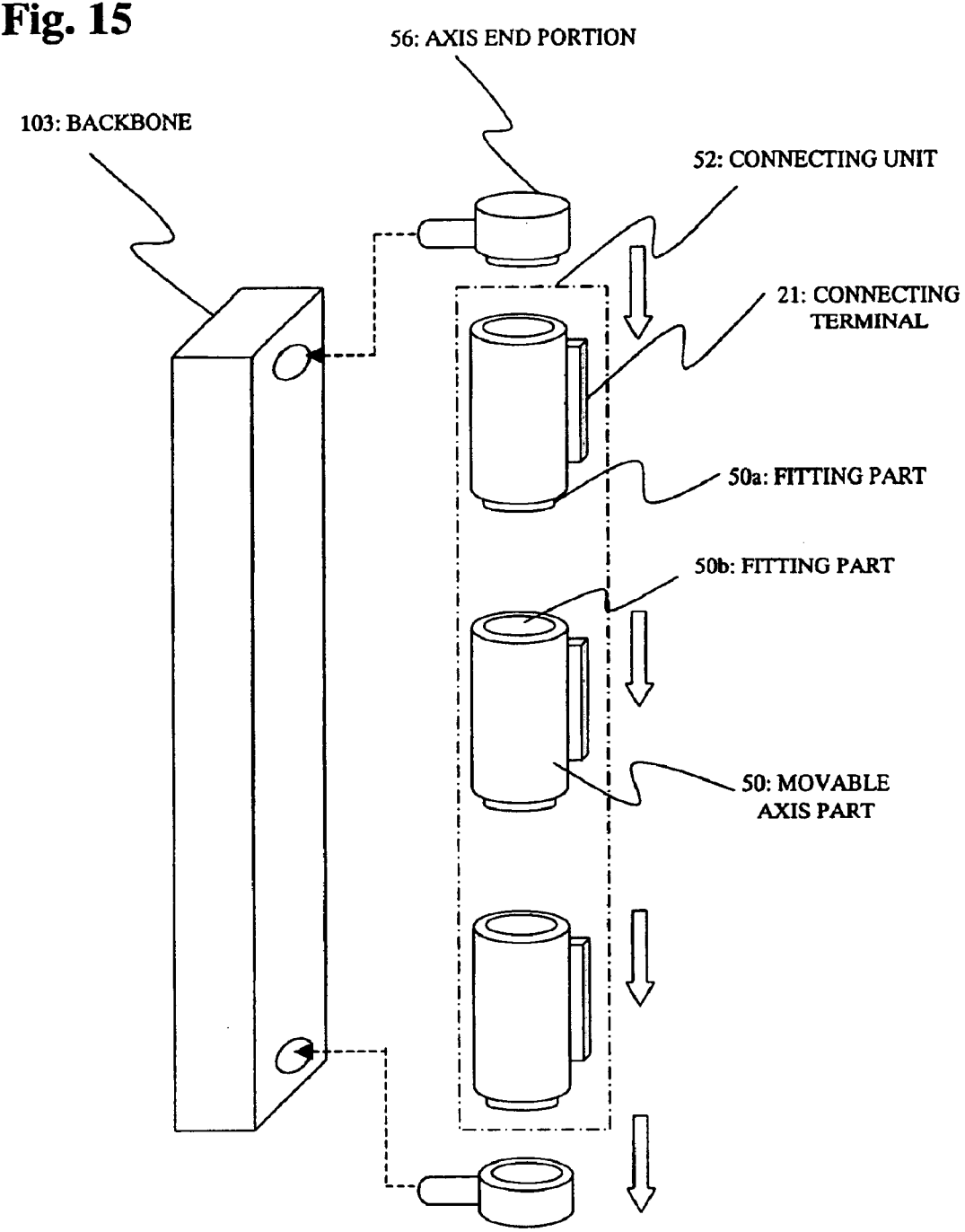

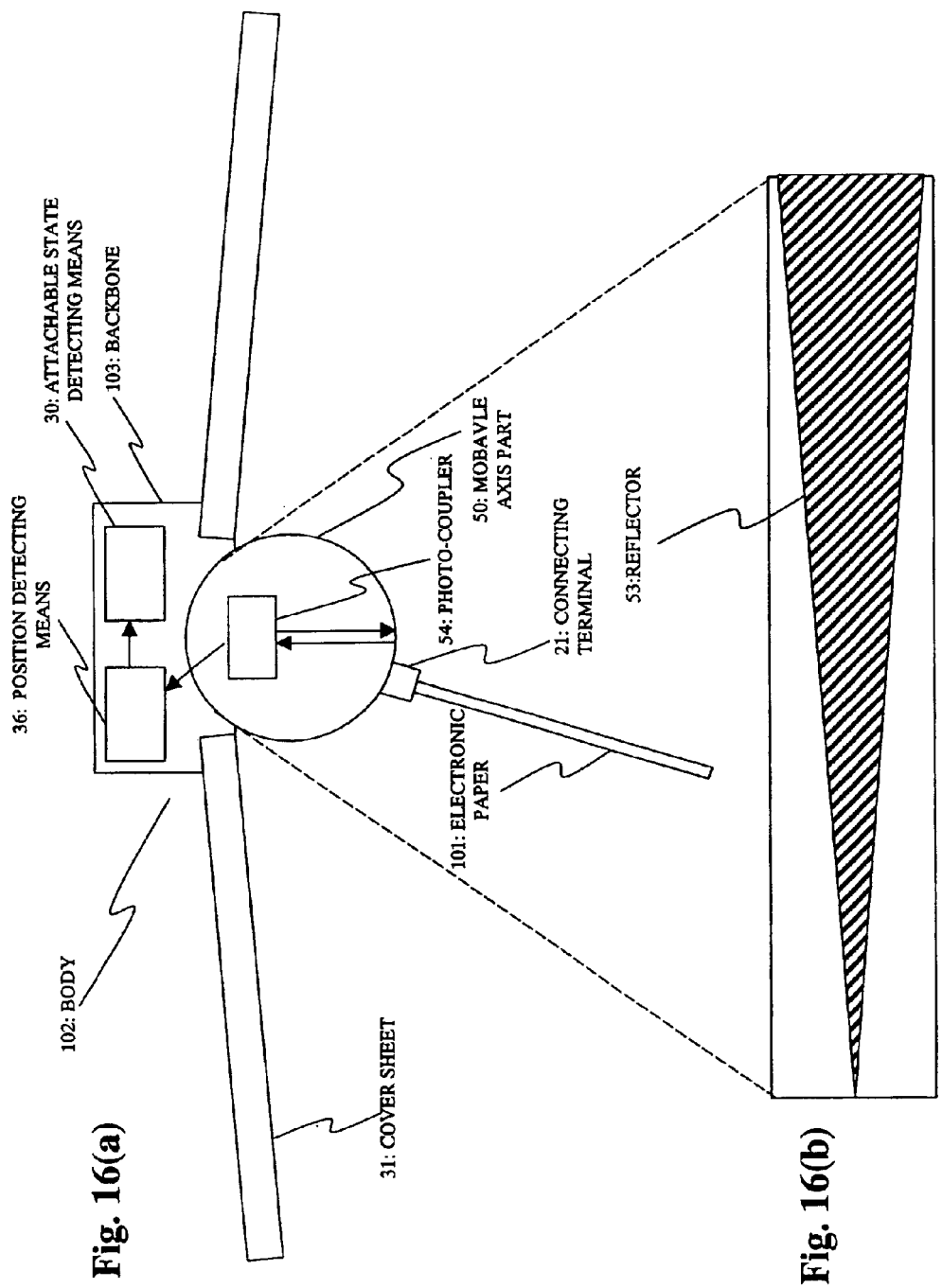

| CONNECTING TERMINAL ID NO. | ORDER FROM COVER SHEET | CONNECTING ORDER ID NO. |
|---|---|---|
| 1 | 2 | C1 |
| 2 | 1 | —— |
| 3 | 4 | C2 |
| 4 | 3 | —— |

Fig. 26(a)
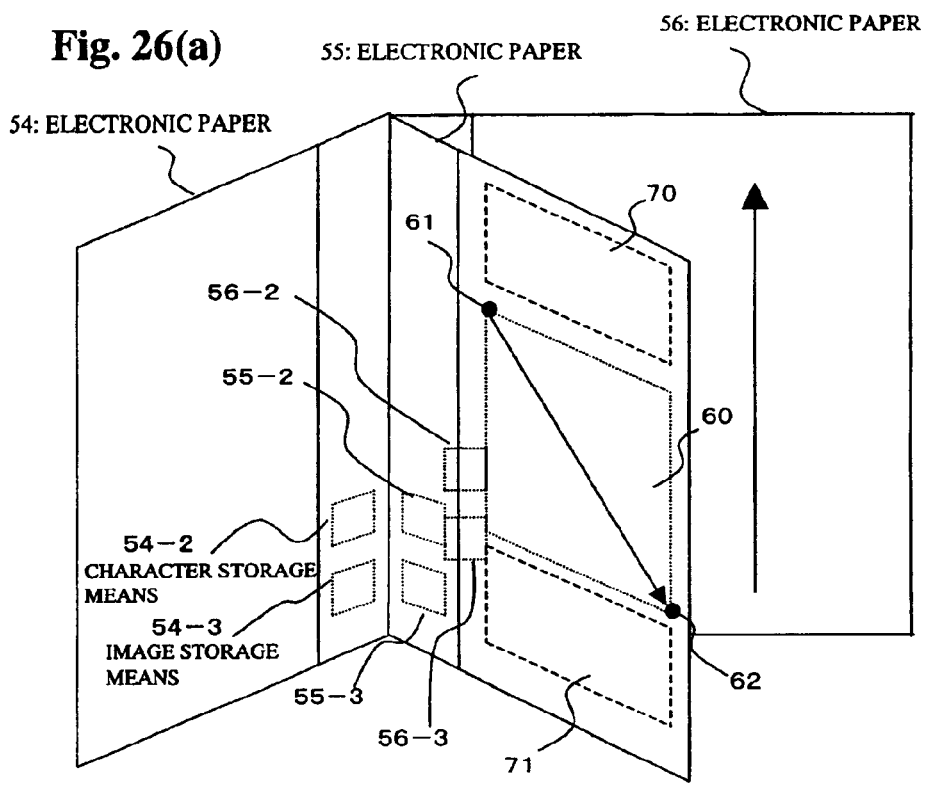
Fig. 26(b) IMAGE OF STORAGE AREA
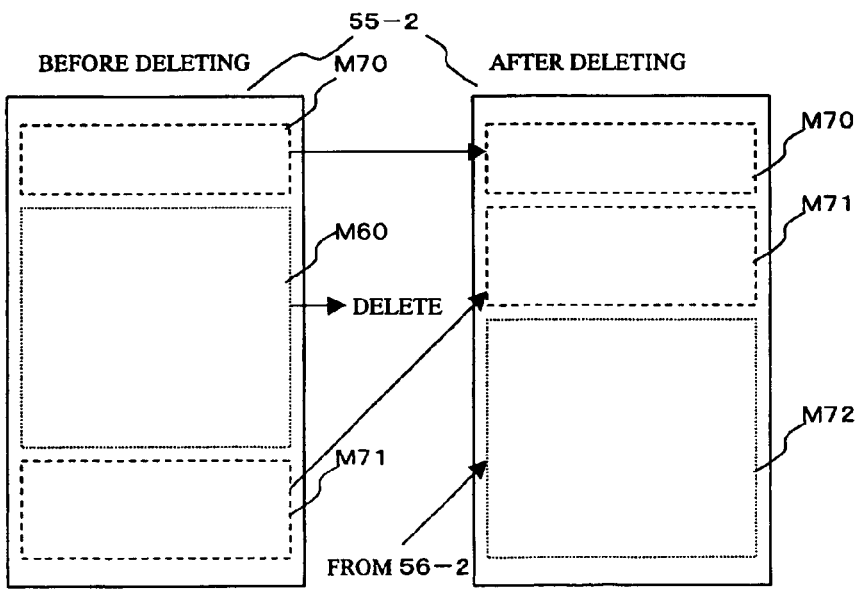

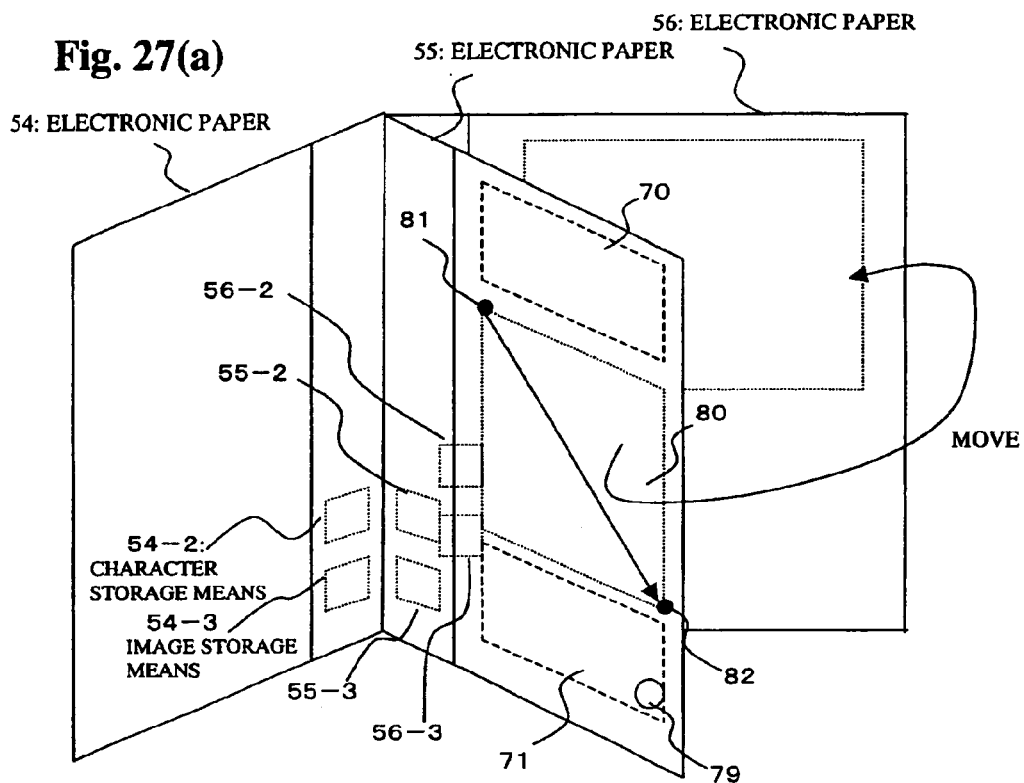
Fig. 27(a)
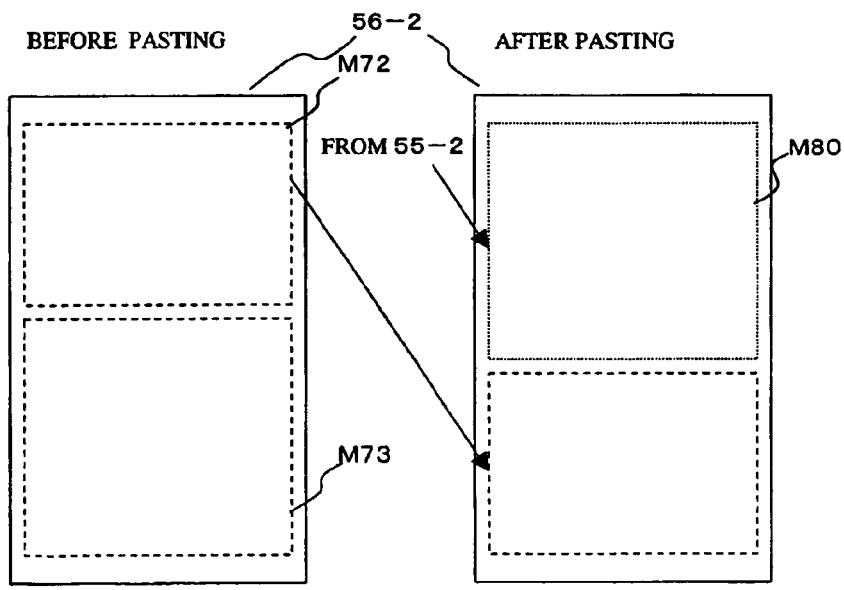
Fig. 27(b) IMAGE OF STORAGE AREA

ELECTRONIC FILE WITH FLEXIBLE DISPLAY MEDIUM

BACKGROUND OF THE INVENTION

1. Technical Field

This invention relates to an electronic paper file formed like a notebook by binding a plurality of electronic papers that are flexible media.

2. Description of the Related Art

The more the recent information technology society progresses, the more the performance of the display medium such as CRT (Cathode Ray Tube), LCD (Liquid Crystal Display), and so on had been improved rapidly. However, regarding the facility of reading and using, those display media were not superior to the paper that has always been used as an information medium. Therefore, a new concept called the "Electronic Paper" was proposed as a flexible display medium, and the technology to materialize the electronic paper are studied in many ways (See pp209 to 251 of "Japan Hardcopy '99—Theses" published by The Imaging Society in Japan).

Recently, the electronic paper file formed like a notebook by binding a plurality of electronic papers has proposed (PCT Japanese translation publication No. 11-502950). Such electronic paper file not only can make easy to manage many electronic papers, but also can make efficient use of the electronic paper file as the display medium that is easier to read and use.

However, it happened that the conventional electronic paper file couldn't display the whole of mass data like the data of the encyclopedia, the collection of works, and etc. by the electronic paper. Such problem can be solved by attaching enormous numbers of pages of electronic papers to the electronic paper file, but such electronic paper file is not only bulky to carry about, but also hard to operate.

In addition, in the conventional electronic paper file, the content displayed by the electronic paper couldn't be edited by a simple operation. That is to say, it is preferable that the electronic paper is arranged so as to edit the content displayed by the electronic paper in such a way of writing characters or illustrations into a paper page, which is a familiar habit to human. However, it is true that such editing technology has not been established yet.

SUMMARY OF THE INVENTION

The invention is proposed considering the above existing conditions, and has an object to provide an electronic paper file with the superior operating performance. In order to achieve the object, the invention adopts following meas.

It is assumed in the invention that an electronic paper file comprises an electronic paper of a flexible display medium and a cover to which a plurality of electronic papers can be attached.

First storage means stores display-data to be displayed on the electronic paper. Page selecting means selects a desired page. And first display control means obtains display-data corresponding to the desired page selected by the page selecting means from the first storage means, and then display the data on the electronic paper.

As configured above, in case where enormous numbers of pages of electronic papers are not attached to the electronic paper file, the electronic paper file can display the whole of mass data like the data of the encyclopedia and the collection of works by the electronic papers. Accordingly, it is possible to improve the operating performance of the electronic paper file.

In addition, in order to edit the content displayed by the electronic paper by a simple operation, the under mentioned means may be adopted.

Position selecting means selects a specific position or area on the electronic paper. Editing means edits the display-data corresponding to the selected position or area and updates the other display-data to be displayed on the other electronic paper, the data that is relevant to this editing. And display light control means displays the display-data edited by the editing means on the electronic paper.

According to the above configuration, when a specific page (of the electronic paper) is edited, the other pages relevant to this editing can be updated automatically.

BRIEF DESCRIPTION OF THE DRAWINGS

FIG. 15 is a schematic view of a cover adopting a rotatable structure.

FIG. 16 is a diagram showing a method of detecting a position of a connecting terminal of a cover.

FIG. 26 is a diagram showing the editing (deleting) processing of an electronic paper of the invention.

FIG. 27 is a diagram showing the editing (moving) processing of an electronic paper of the invention.

DETAILED DESCRIPTION OF THE INVENTION

Figure 1:
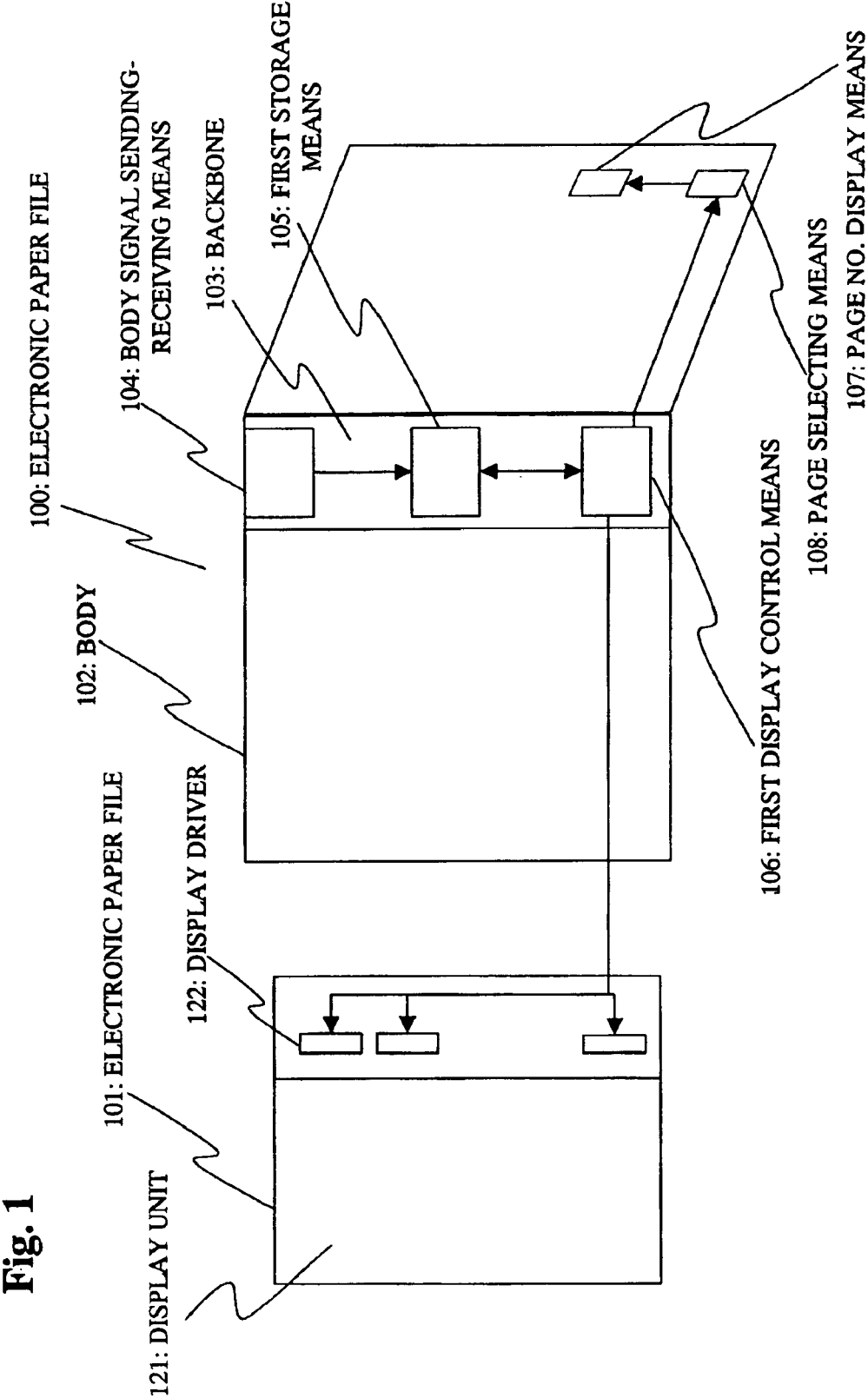
FIG. 1 is a block diagram of an electronic paper of this invention.

The following explanation refers to the embodiments of the invention according to the drawings. The embodiments simply show examples in which the invention is put into practical use, and does not restrict the scope of the technical field of the invention.

An electronic paper file 100 of the invention comprises an electronic paper 101 of a flexible display medium and a cover 102 to which a plurality of electronic papers 101 can be attached.

At a specific position of a spine board 103 of the cover 102, sending-receiving means 104 for obtaining data to be displayed on an electronic paper (which is called "display-data" hereafter) from a storage medium like CD-ROM, a flash memory, or the like, and first storage means 105 for storing thus obtained display-data are provided.

That is to say, when the sending-receiving means 104 is connecting with a storage medium, display-data stored in the storage medium is inputted and stored in the first storage means 105. Besides, it is possible to apply a storage medium like an IC memory or an IC card to be built in the cover 102 as the first storage means 105.

Figure 2:
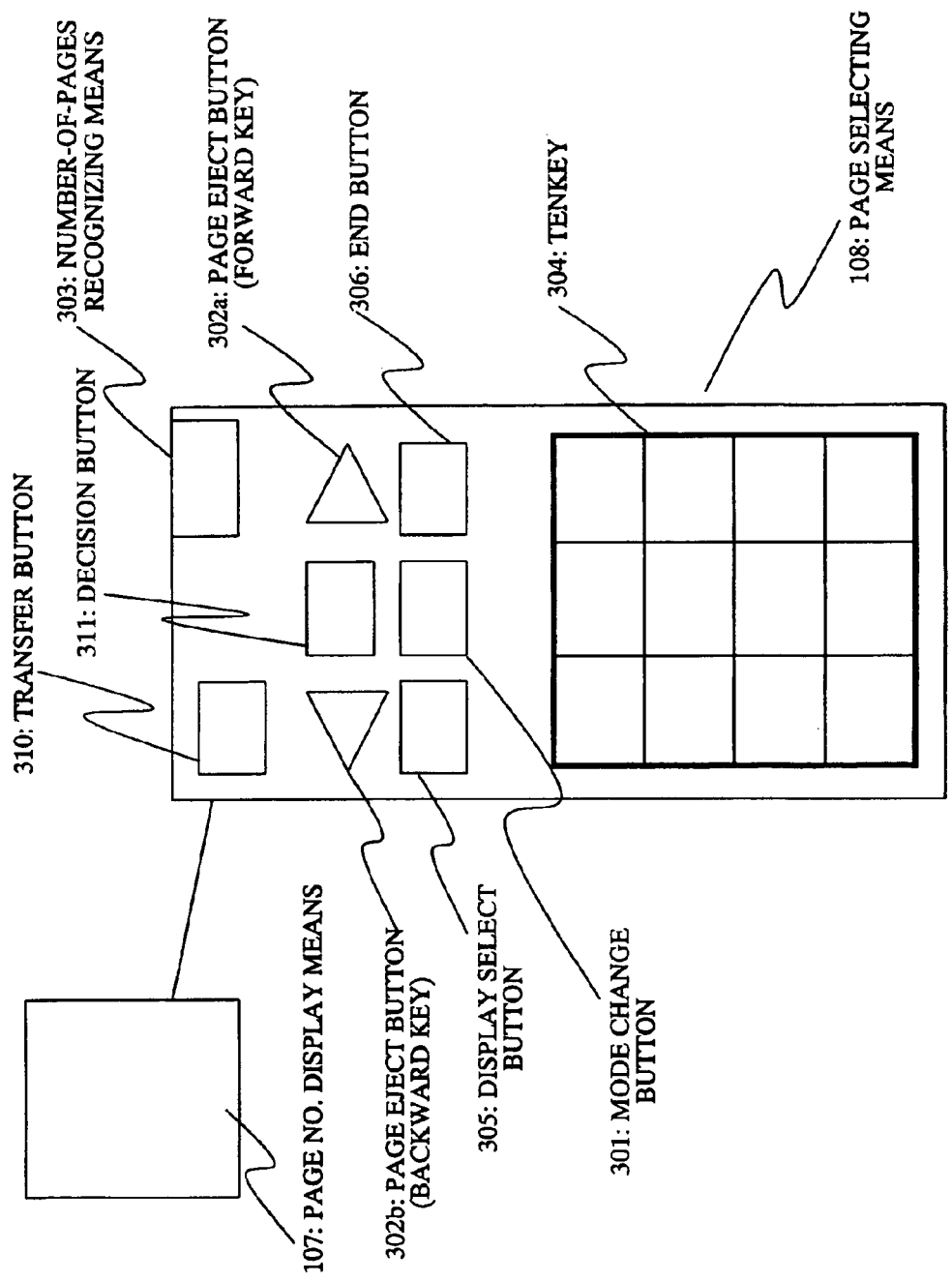
FIG. 2 is a diagram showing the page selecting means.

First, a user selects a desired page number of display-data stored in the first storage means 105 by a button provided on page selecting means 108 shown in FIG. 2. Thus selected page number is displayed on page number display means 107, and the user confirms whether the exact page number was selected or not. After confirming that the exact page number could be selected, the user press a transfer button 310 provided on the page selecting means 108 and the selected page number is transferred to first display control means 106 provided on the spine board 103.

According to the page number selected as above, the first display control means 106 obtains display-data from the first storage means 105. However, since the display-data obtained in this way varies in form such as ASCII presentation, Binary presentation and so on, the first display control means 106 is to convert the form of the display-data to the dot presentation that is the displaying form of the display unit of the electronic paper 101, and then transfer the data to a display driver 122.

Besides, it is preferable that the first display control means 106 is arranged so as to let a luminous sheet of the electronic paper emit automatically, which will be explained later, when the electronic paper is powered on.

The cover 102 and the electronic paper 101 are provided with a pair of connecting terminals (a pair of female and male connecting terminals, for example) respectively, which can be connected with each other electrically and physically. It is needless to say that, if connecting terminals are not connected physically but electrically, it is possible to display characters corresponding to the display-data on a display unit 121. One of the methods of connecting electrically is to provide the wireless communication function to both the cover 102 and the electronic paper 101 (for instance, communication function complying with IRDA, Bluetooth, or the like)

The electronic paper 101 of the invention is detachable from the cover 102. Therefore, in order to transfer the display-data to only the connecting terminal 21 to which the electronic paper is attached, the cover 102 may be provided with attachable state detecting means 30 explained hereafter.

Figures 10A, 10B:
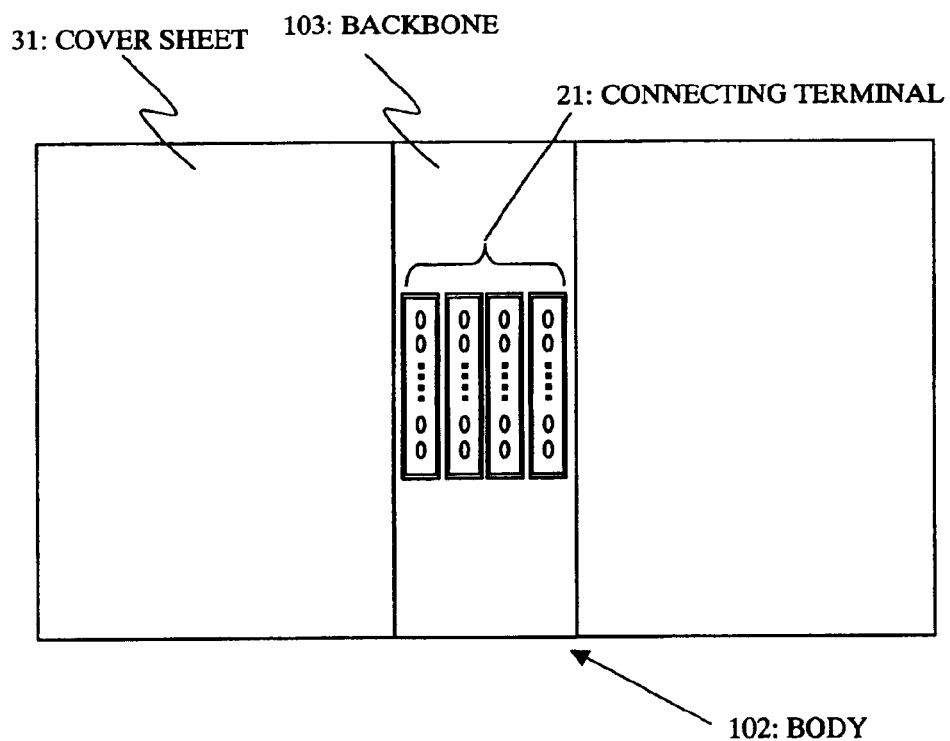
FIG. 10 is a diagram showing a state that a connecting terminal of a cover is fixed on the cover.

As shown in FIG. 10(a), each connecting terminal 21 of the cover 102 is placed and fixed at a specific position of the cover 102. Meanwhile the first storage means 105 stores a number to identify each connecting terminal 21 of the cover 102 (which is called "connecting terminal ID number" hereafter) together with the arrangement order.

A method of determining the connecting terminal ID number is not restricted specially, but it is preferable the number increases as going away from a cover sheet 31 of the electronic paper file. The connecting terminal ID number in this embodiment is determined as shown in FIG. 10(b), that is to say, the connecting terminal ID number "1" is imparted to a connecting terminal 21 placed at the nearest position to the cover sheet 31, "2" is to a communication terminal 21 near the second, "3" is to the communication terminal 21 near the third, and "4" is to the communication terminal 21 near the fourth.

Figure 11:
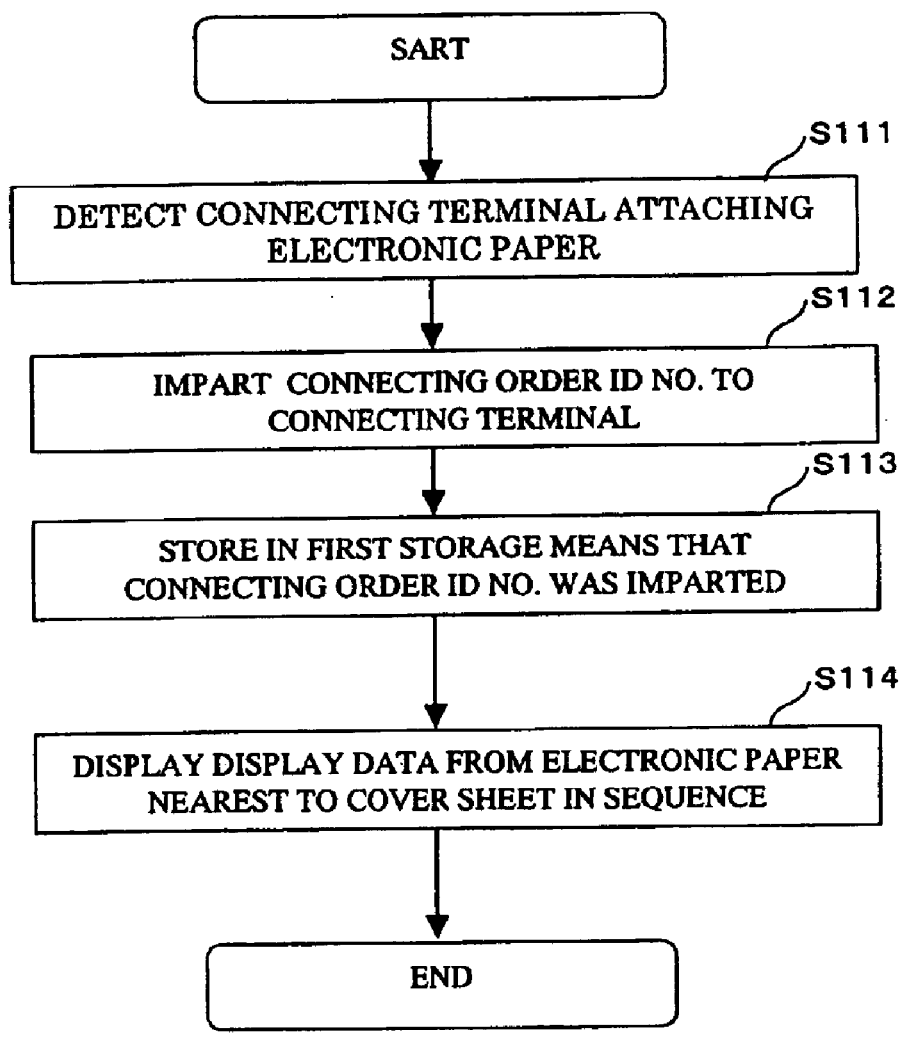
FIG. 11 is a flowchart showing an operation of imparting a connecting order ID Number to a connecting terminal.

The attachable state detecting means 30 detects the connecting terminal 21 to which the electronic paper 101 is attached, and then obtains the connecting terminal ID Number of thus detected connecting terminal 21 from the first storage means 105 (FIG. 11, S111). For instance, when the electronic paper 101 is attached to the connecting terminal 21 of the connecting terminal ID No. 1 and the other electronic paper 101 is attached to the connecting terminal 21 of the connecting terminal ID No. 3, the attachable state detecting means 30 is to obtain the connecting terminal ID Nos. 1 and 3 from the first storage means 105.

And then, the attachable state detecting means 30 imparts a number for discriminating the connecting order (which is called connecting order ID No.) to the connecting terminals 21 of thus obtained connecting terminal ID Nos. 1 and 3 (FIG. 11, S112). That is to say, the electronic papers are attached to the connecting terminal 21 at the nearest position to the cover sheet 31 (the connecting terminal ID No. 1) and to the connecting terminal 21 near the third to the cover sheet 31, respectively. Accordingly, the attachable state detecting means 30 imparts to the connecting terminal 21 of the connecting terminal ID No. 1 the connecting order ID No. C1 representing that the attached electronic paper is the nearest to the cover sheet 31 (which will be explained later), while imparting to the connecting terminal 21 of the connecting terminal ID No. 3 the connecting order ID No. C2 representing that the attached electronic paper is near the second to the cover sheet 31.

In addition, the attachable state detecting means 30 stores in the first storage means 105 the records to the effect that the connecting order ID Nos. C1 and C2 were imparted as above (FIG. 11, S113), and notifies the first display control means 106 of those connecting order ID Nos. C1 and C2. Thereby, in response to the notice, the first display control means 106 transfers display-data to the connecting terminals 21 of those connecting terminal ID Nos. 1 and 3. As configured in such way, it is possible to display the display-data in the order in which the electronic paper is nearer to the cover sheet, without transferring (omitting the display) the display-data to the connecting terminal 21 to which the electronic paper is not connected (FIG. 11, S114).

Besides, in the above explanation there is an expression that the connecting order ID number is imparted to the connecting terminal; however, the definite method for imparting the connecting order ID number is not particularly restricted to this. For instance, in case where the first storage means 105 stores the connecting terminal ID Nos. 1 to 4, regarding the connecting ID Nos. 1 and 3 of the connecting terminals 21 that are attached to the electronic paper 101 flags may be hang in the storage areas corresponding respectively. Thereby, it may be considered that the connecting order ID No. C1 is imparted to the connecting terminal 21 of the connecting terminal ID No. 1 and the connecting order ID No. C2 is imparted to the connecting terminal 21 of the connecting terminal ID No. 3.

The following explains about the method that the attachable state detecting means 30 detects the connecting terminal 21 to which the electronic paper 101 is attached.

Figure 12:
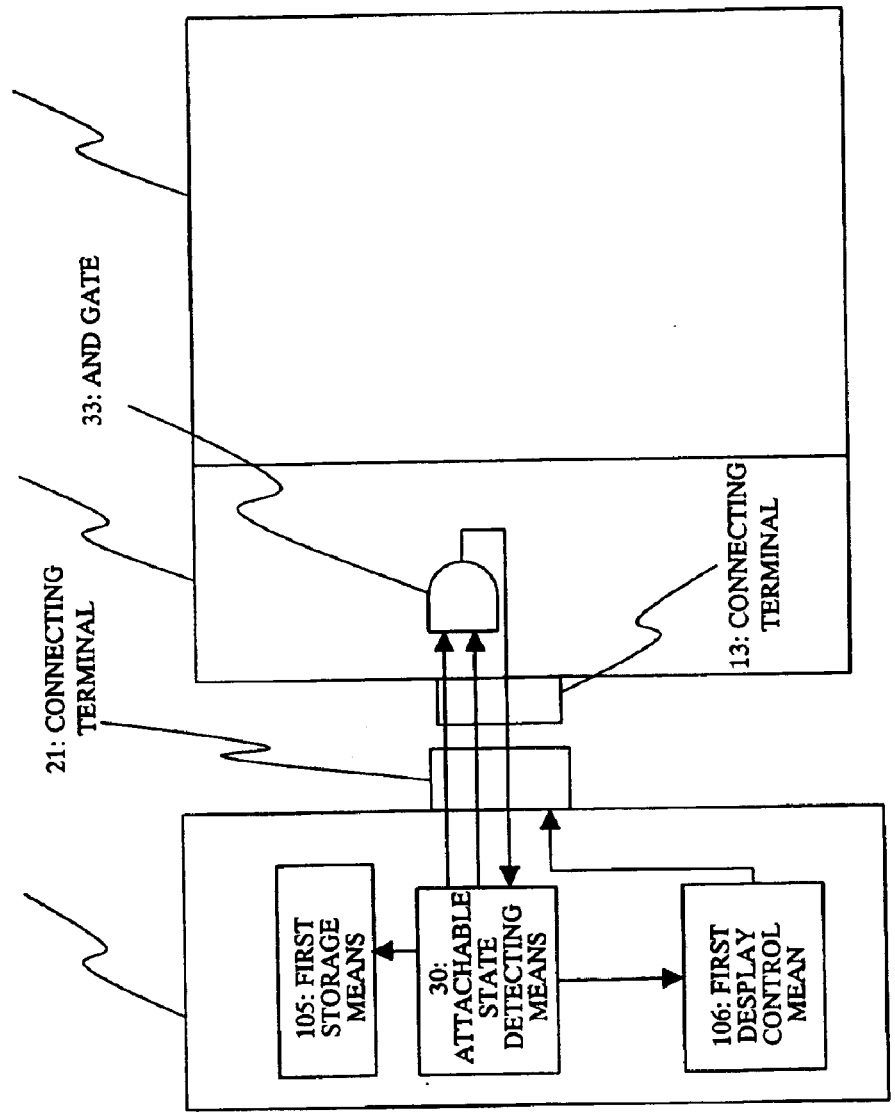
FIG. 12 is an diagram explaining about a method of detecting whether an electronic paper is attached to a connecting terminal of a cover.

As shown in FIG. 12, the cover 102 is provided with the attachable state detecting means 30, from which two signals indicating "1" are outputted to the respective connecting terminals 21. At this time, in case where the electronic paper 101 is attached to the connecting terminal 21, the two "1" signals are inputted to AND gate 33 of display driver part 12 of the electronic paper through the connecting terminal 13 of the electronic paper. And then the "1" signals are sent back to the attachable state detecting means 30 via the connecting terminal 13 and the connecting terminal 21. Under this arrangement, the attachable state detecting means 30 can detect that the electronic paper 101 is connected with the connecting terminal 21 that is a sending side of the electric signal.

Figure 13:
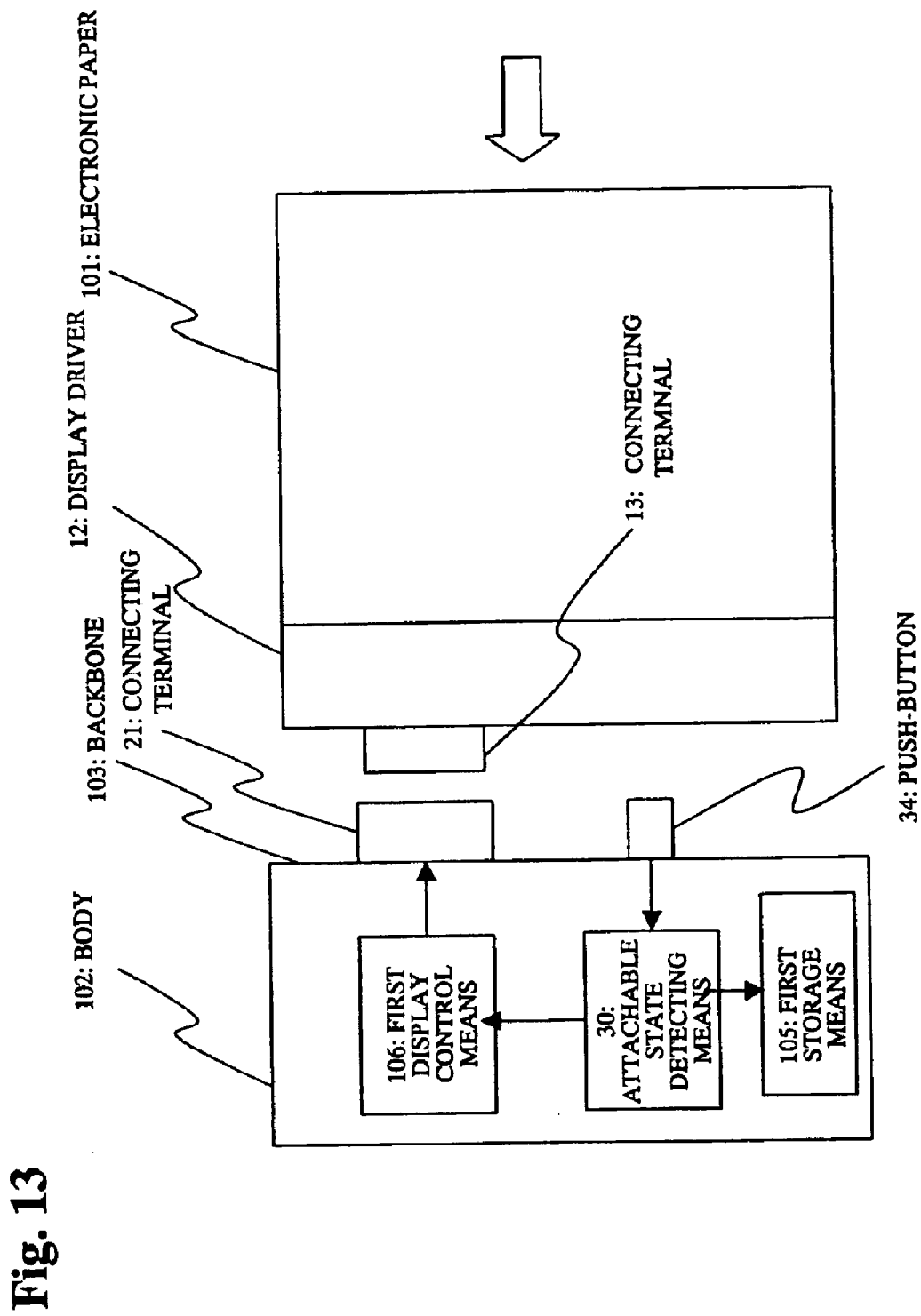
FIG. 13 is a diagram explaining about a method of detecting whether an electronic paper is attached to a connecting terminal of a cover.

Otherwise, as shown in FIG. 13, even in case where a push-button 34 is provided on inside of the spine board 103 of the cover 102, it is possible to obtain the same effect as above. That is to say, it is arranged that at the same time that the electronic paper 101 is attached to a specific connecting terminal 21, the push-button be pressed down by the electronic paper 101. According to such configuration, the attachable state detecting means 30 can detect the electronic paper 101 is attached to the specific connecting terminal 21 by the pressing-down of the push-button 34.

Figure 14:
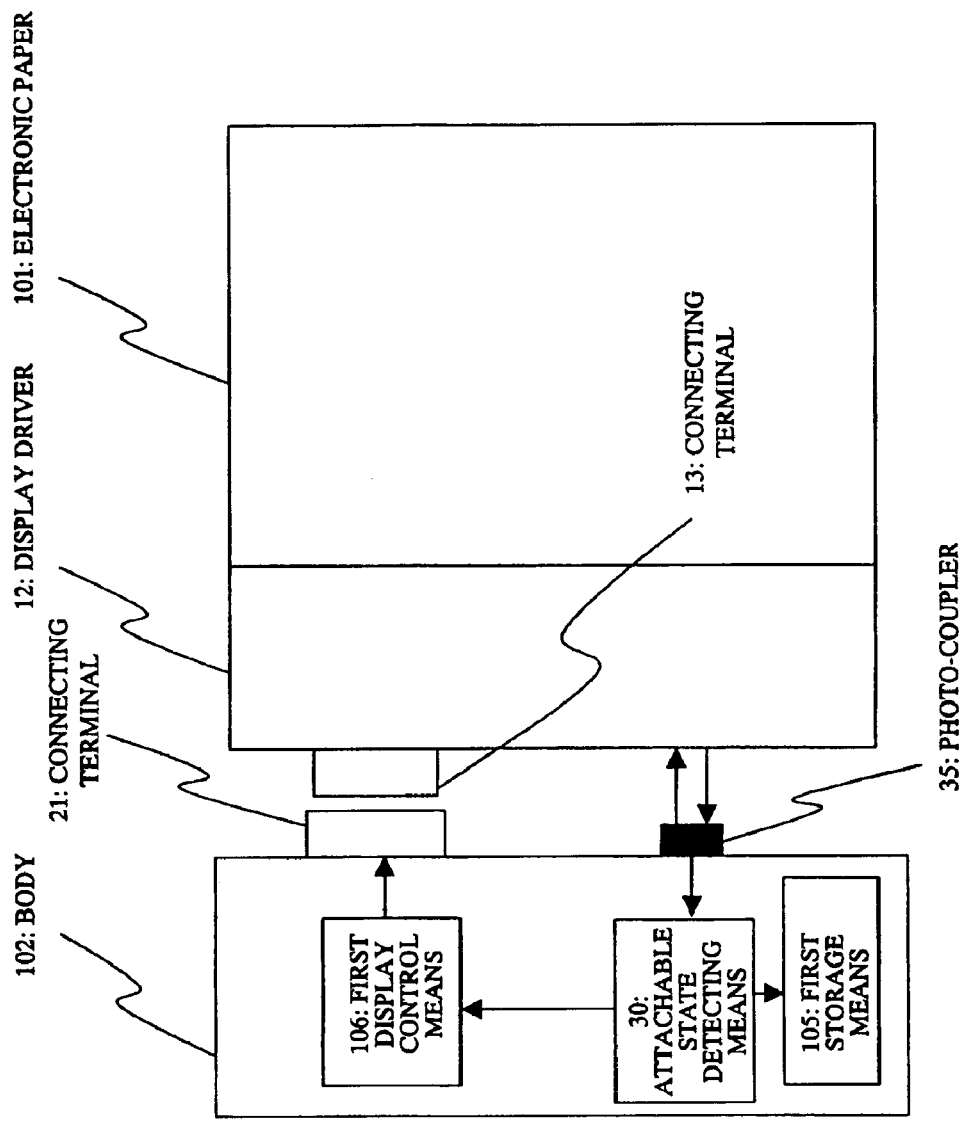
FIG. 14 is a diagram explaining about a method of detecting whether an electronic paper is attached to a connecting terminal of a cover.

Or, as shown in FIG. 14, a photo-coupler 35 emitting light in the direction of a projecting part of the connecting terminal 21 is provided on the cover 102. The attachable state detecting means 30 may detect the attaching of the electronic paper 101 on the basis of the reflected light volume of the emitted light. That is to say, when the electronic paper 101 is attached to the connecting terminal 21, the light emitted from the photo-coupler 35 is reflected on the electronic paper 101. Thereby, the attachable state detecting means 30 can recognizes that the photo-coupler 35 receives a specific volume of reflected light, and then detects that the electronic paper 101 is attached to the connecting terminal 21.

The above description refers to the structure that the connecting terminal 21 of the cover is fixed on the spine board 103, but it is convenient that the connecting terminal 21 can be rotated as follows.

That is to say, as shown in FIG. 15, the connecting terminal 21 is arranged that fitting parts 50a and 50b are provided at upper and lower ends of the movable axis part 50 with a specific length and in a cylindrical form and be mutually and freely connectable with the upper and lower ends of the other movable axis parts 50. A reflector 53 is provided on the inside of the circumference of the movable axis part 50, as shown in FIG. 16(b), of which the width is getting narrow along the circumference aspect. In addition, the connecting terminal 21 of the cover is provided in the direction of the axis on the outside of the movable axis part 50. Thus structured movable axis parts 50 are connected with each other, and thereby the connecting unit 52 is configured.

Figures 17A, 17B:
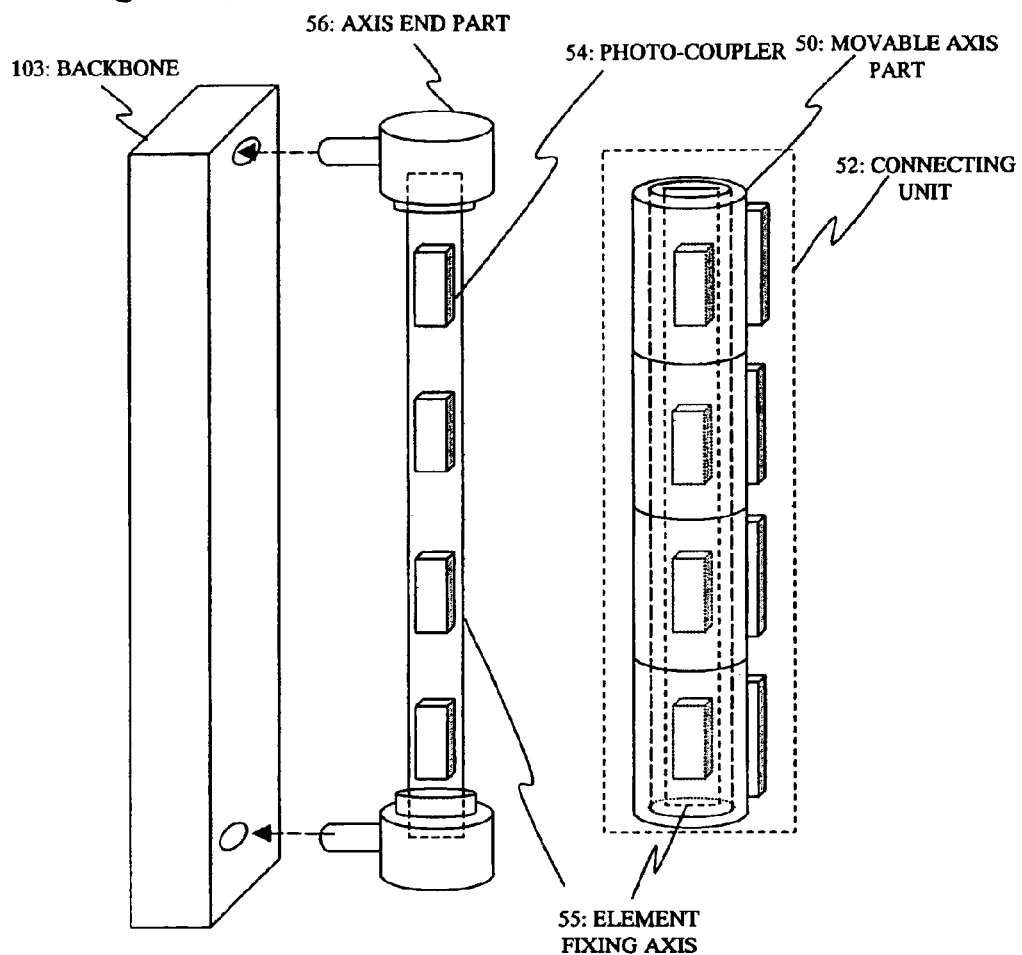
FIG. 17 is a diagram showing that a photo-coupler is provided inside of a connecting unit.

On the other hand, as shown in FIG. 17, the photo-coupler is fixed on an element fixing axis 55 of the movable axis part 50 so as to face with the reflector 53. The element fixing axis 55 is inserted in the connecting unit 52 and fixed on axis end part 56. The axis end part 56 is provided rotatably with the upper and lower ends and fixed into the spine board 103. Regarding means for fixing the axis end part 56 to the spine board 103 and for fixing the both ends of the element fixing axis 55 with the both ends of the axis end part 56, since those do not configure the essential part of the invention, said means are not explained in detail here.

In case where the connecting unit 52 is attached to the spine board 103 as above, each photo-coupler 54 emits in the same direction. And at this time, if the directions of the connecting terminals 21 attached to each movable axis part 50 are orientated to the same direction, the reflectors 50 attached on the inside of each connecting terminal has the same width in the axis direction along with the inside of the reflector 53. Therefore, it is needless to say that signals corresponding to the rotated angle of each movable axis part 50 (that is to say, the rotated angle of each electronic paper 101) are outputted from the photo-couplers 54.

Figure 19:
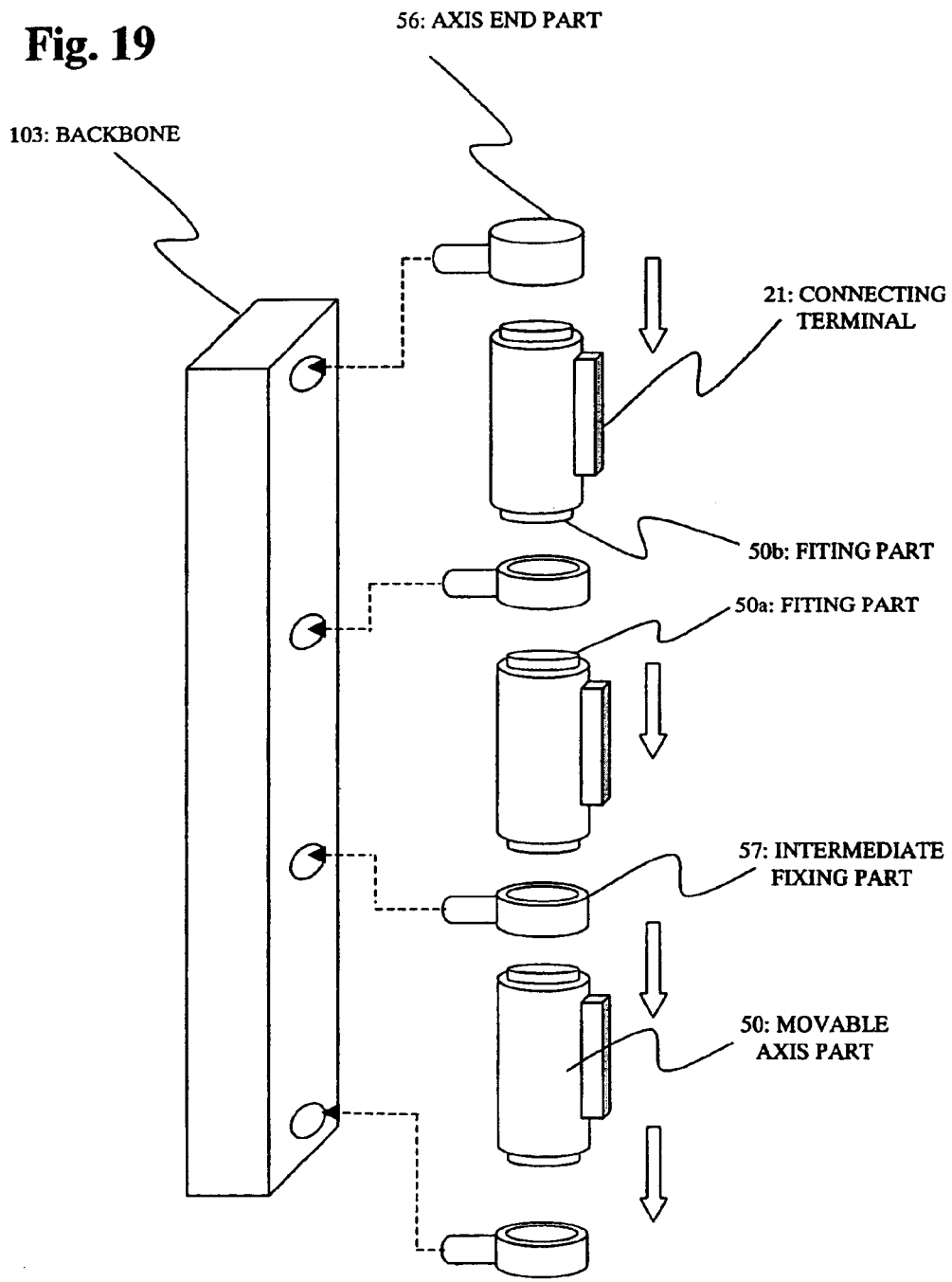
FIG. 19 is a diagram showing a state that an intermediate fixing part is applied.

The above explains about the configuration that each movable axis part 50 is directly connected with each other. However, it may be arranged as shown in FIG. 19 that an intermediate fixing part 57 be intervened between movable axis parts 50, thereby the connecting unit can be attached to the spine board 103 stably.

Figure 20:
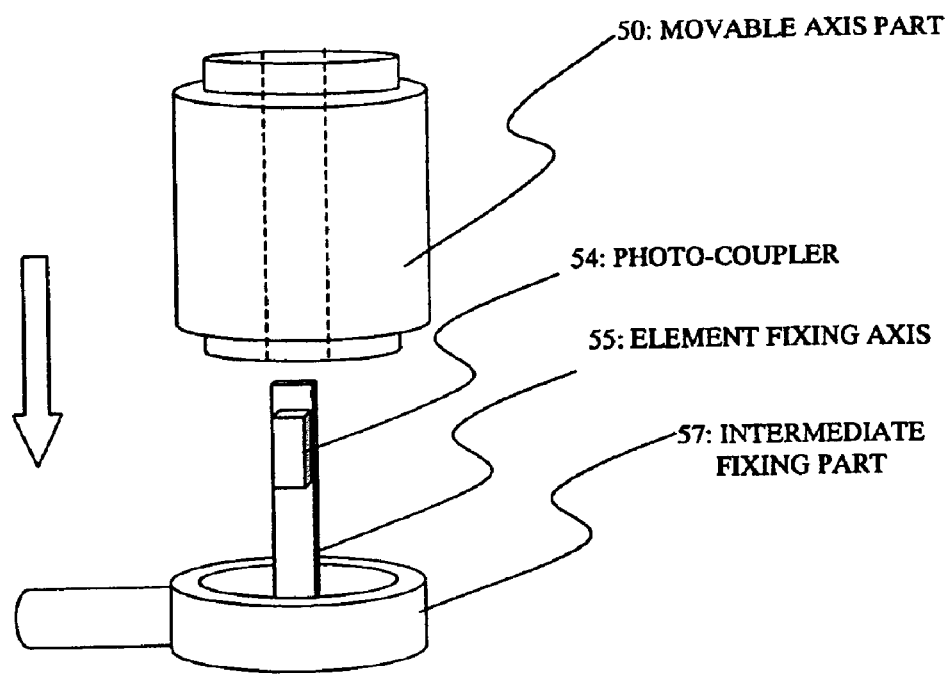
FIG. 20 is a diagram showing that an element fixing axis is provided with an intermediate fixing part.

The fitting parts 50a and 50b of respective movable parts 50 are inserted into the intermediate fixing parts 57 rotatably, therefore the connecting unit 52 comprising those movable parts 50 can be configured. The connecting unit 52 is fixed to the spine board 103 by the axis end part 56 and also fixed to the spine board 103 by the intermediate fixing part 57 in the same way as described above. In this case, the element fixing axis 55 may comprise the same configuration as above (See FIG. 17), but it may be arranged as shown in FIG. 20 that the element fixing axis 55 be protruded to the inside of each movable axis part 50 from each intermediate fixing part 57 or each axis end part 56.

Figure 21:
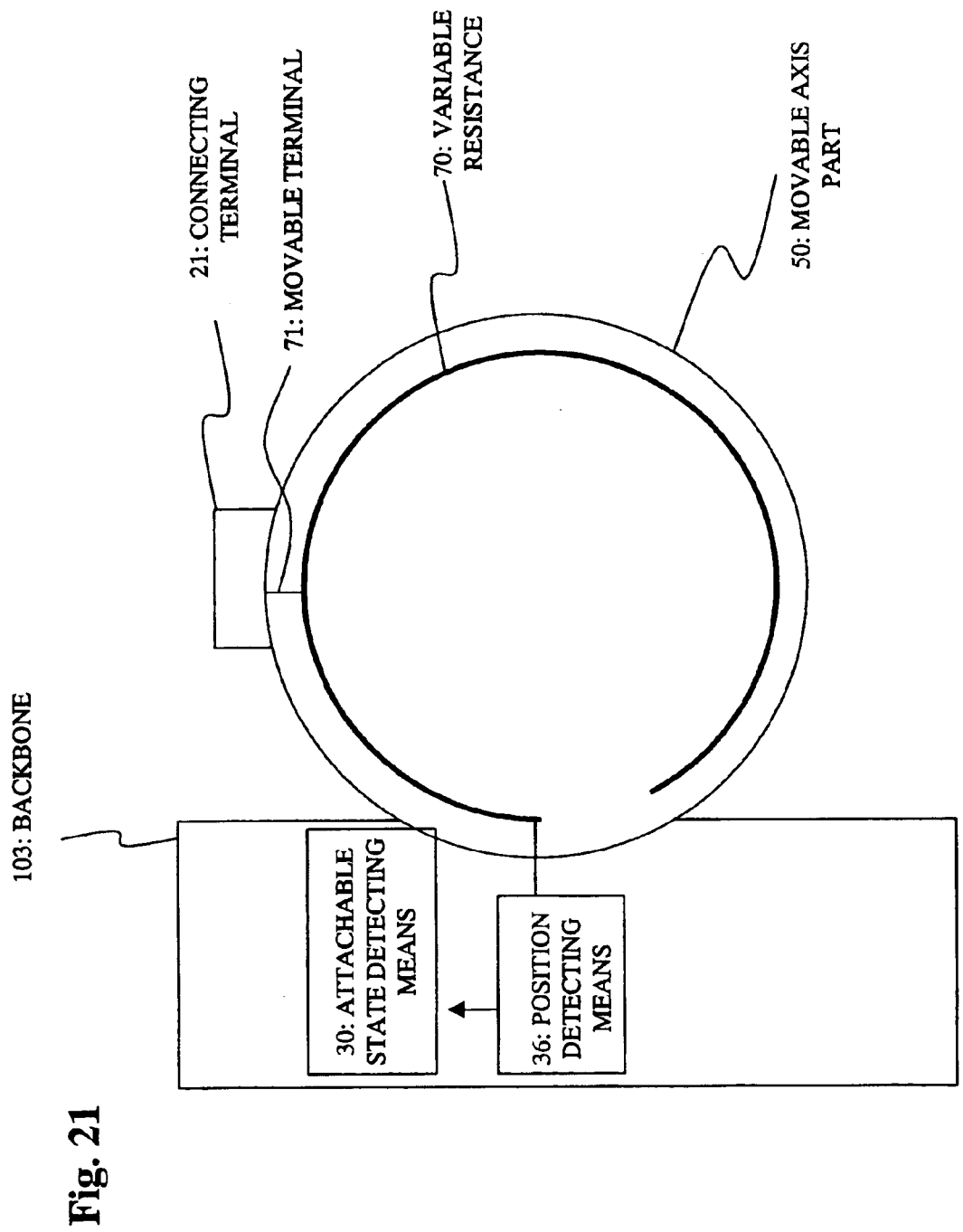
FIG. 21 is a diagram explaining about a method of detecting a position of a connecting terminal of a cover.

In this case, even if a variable resistance 70 is adopted instead of the photo-coupler 54 as shown in FIG. 21, it is possible to obtain the rotated angle of each electronic paper. The variable resistance 70 in the shape of a doughnut is fixed to each element fixing axis 55 so as not to prevent the rotation of the movable axis part 50, and the movable terminal 71 contacting the doughnut variable resistance 70 is provided on each inside of movable axis part 50. According to this configuration, when each connecting terminal 21 is oriented in a specific direction, each variable resistance 70 outputs the same value as that of the connecting terminal 21. Therefore it is possible to obtain the rotational angle of each electronic paper.

Besides, the invention is arranged in the above that the reflector 53 is provided on the inside of the circumference of the movable axis part 50, however, the invention is not restricted to this. That is to say, if the movable axis part 50 is made of a transmissive material, the reflector 53 may be provided on the outside of the circumference of the movable axis part 50, thereby it is possible to obtain the same effect.

When the rotated angle of each connecting terminal 21 of the cover can be obtained by using the above photo-coupler 54 or variable resistance 70, the rotated angle is notified to the attachable state detecting means 30 by position detecting means 36 of the cover. Thereby, after detecting the connecting terminal 21 to which the electronic paper is attached, the attachable state detecting means 30 imparts the connecting order ID number to the detected connecting terminal 21 on the basis of the content notified as above. The detailed explanation of the operations is explained as follows.

It is assumed in the following description, as shown in FIGS. 17(*a*) and 17(*b*), that the connecting terminal ID number 1 is imparted to the connecting terminal 21 at the position nearest to the axis end part 56 on the upper side, the connecting terminal ID number 2 is imparted to the connecting terminal 21 near to the second to the axis end part 56 on the upper side, the connecting terminal ID number 3 is imparted to the connecting terminal 21 near to the third to the axis end part 56 on the upper side, and the connecting terminal ID number 4 is imparted to the connecting terminal 21 near to the fourth to the axis end part 56 on the upper side. Additionally, it is also assumed that those connecting terminal ID Nos. 1 to 4 are stored in the first storage means 105 together with the arrange order.

First of all, after receiving the rotated angle from the position detecting means 36, the attachable state detecting means 30 detects the connecting terminal 21 to which the electronic paper 101 is attached as described above. It is needless to say that the starting order of operations is not restricted regarding the operation that the position detecting means 36 obtains the rotated angle and the operation that the attachable state detecting means 30 detects the connecting terminal to which the electronic paper 101 is attached. That is to say, those operations may be performed in parallel (FIG. 18, S181 and S182)

In the next place, the attachable state detecting means 30 obtains from the first storage means 105 the connecting terminal ID number of the connecting terminal 21 detected as above. For instance, when the electronic paper is attached to respective connecting terminals 21 of the connecting terminal ID Nos. 1 and 3, the attachable state detecting means 30 obtains the connecting terminal ID Nos. 1 and 3 from the first storage means 105.

Figure 18:
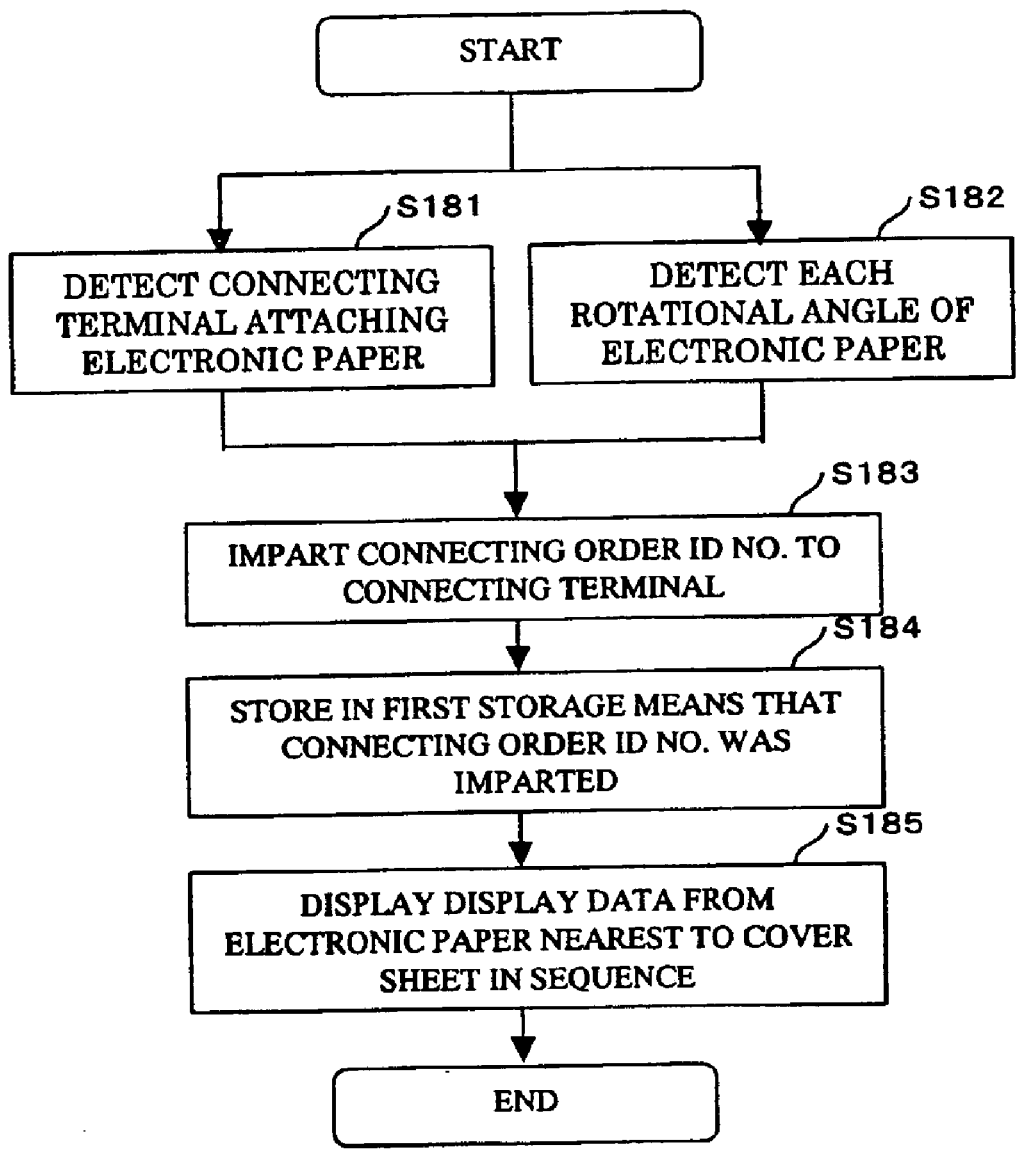
FIG. 18 is a flowchart showing an operation of imparting a connecting order ID Number to a connecting terminal.

The attachable state detecting means 30 imparts the connecting order ID number to respective connecting terminals of the connecting terminal ID Nos. 1 and 3 (FIG. 18, S183). However, as the configuration is assumed that the movable axis part 50 can be rotated, the imparting processing of the connecting order ID number should be performed according to the rotated angle informed from the position detecting means 36 as follows.

For instance, here is explained about a case that the attachable state detecting means 30 is informed from the position detection means 36 that the rotated angle is getting smaller in the order, the connecting terminal 21 of the connecting terminal ID No. 2, the connecting terminal 21 of the connecting terminal ID No. 1, the connecting terminal 21 of the connecting terminal ID No. 4, the connecting terminal 21 of the connecting terminal ID No. 3. In this case, the attachable state detecting means 30 imparts to the connecting terminal 21 of the connecting terminal ID No. 1 the connecting order ID No. C1 representing that the attached electronic paper is the nearest to the cover sheet 31, and the connecting terminal 21 of the connecting terminal ID No. 3 the connecting order ID No. C2 representing that the attached electronic paper 101 is near the second to the cover sheet 31.

Additionally, the attachable state detecting means 30 stores in the first storage means 105 that the connecting order ID Nos. C1 and C2 were imparted (FIG. 18, S184), while notifying the first display control means 106 of the connecting order ID Nos. C1 and C2. Therefore, the first display control means 106 in response to the notice transfers the display-data to the connecting terminals 21 of the connecting terminal ID Nos. 1 and 3. As configured in such way, the display-data are not transferred to the other connecting terminal 21 not connected with the electronic paper (or not be omitted from the displaying), the display-data can be displayed in sequence from the electronic paper near to the cover sheet (FIG. 18, S185).

Figure 22A:
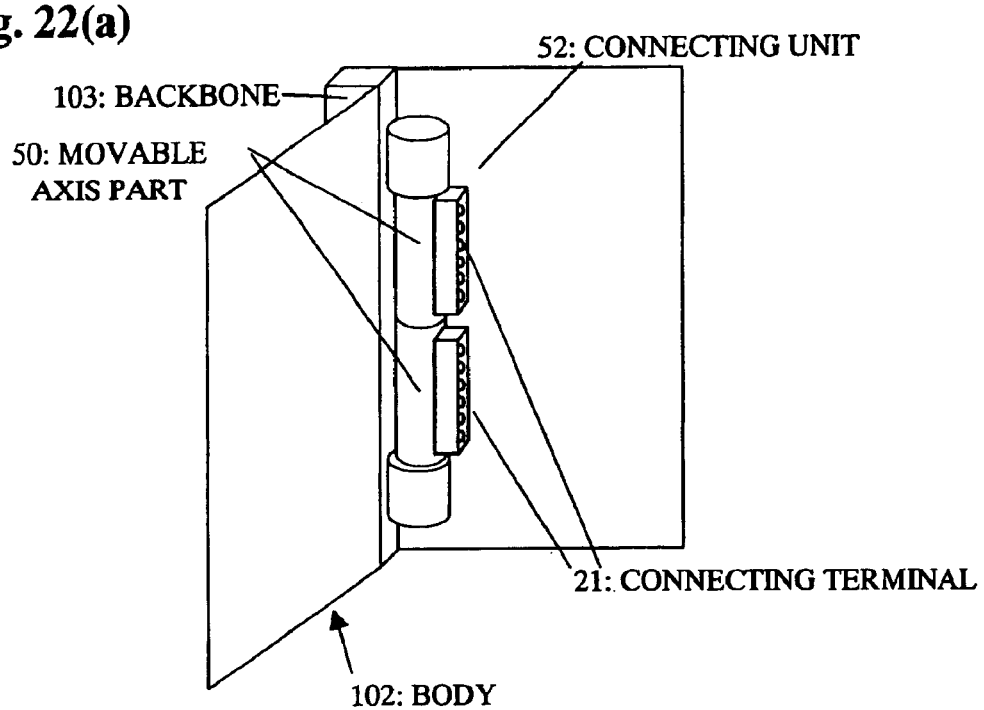
FIG. 22 is a diagram showing that connecting terminals of a cover are provided at different positions in a vertical direction of a cover.
Figure 22B:
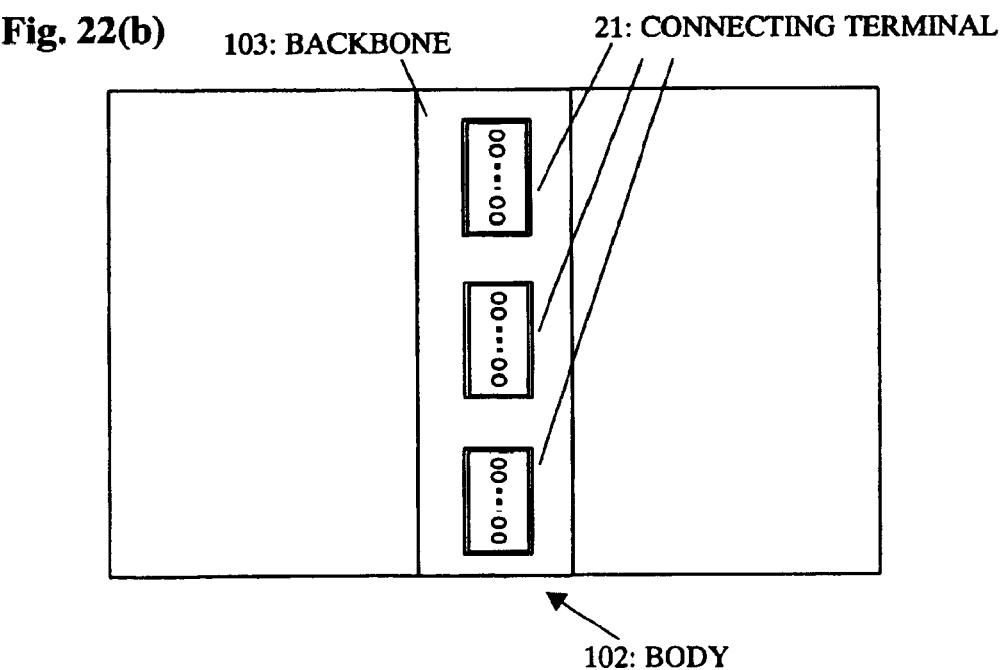

The prescribed connecting terminal 13 of the electronic paper 101 is fixed on a specific position of the electronic paper 101, so that the electronic paper 101 can be connected with only the connecting terminal 21 of the cover that is positioned at a position corresponding to the connecting terminal 13. Therefore, in case where plural connecting terminals 21 are provided respectively at different positions in the vertical direction of the cover 102 as shown in FIGS. 22(*a*) and 22(*b*), the electronic paper 101 must be provided with connecting terminals 13 so as to be able to be connected with respective connecting terminals 21 of the cover. This was an inconvenient matter. Thereupon, in order to settle this inconvenient matter, the invention adopts the following configuration.

Figure 23:
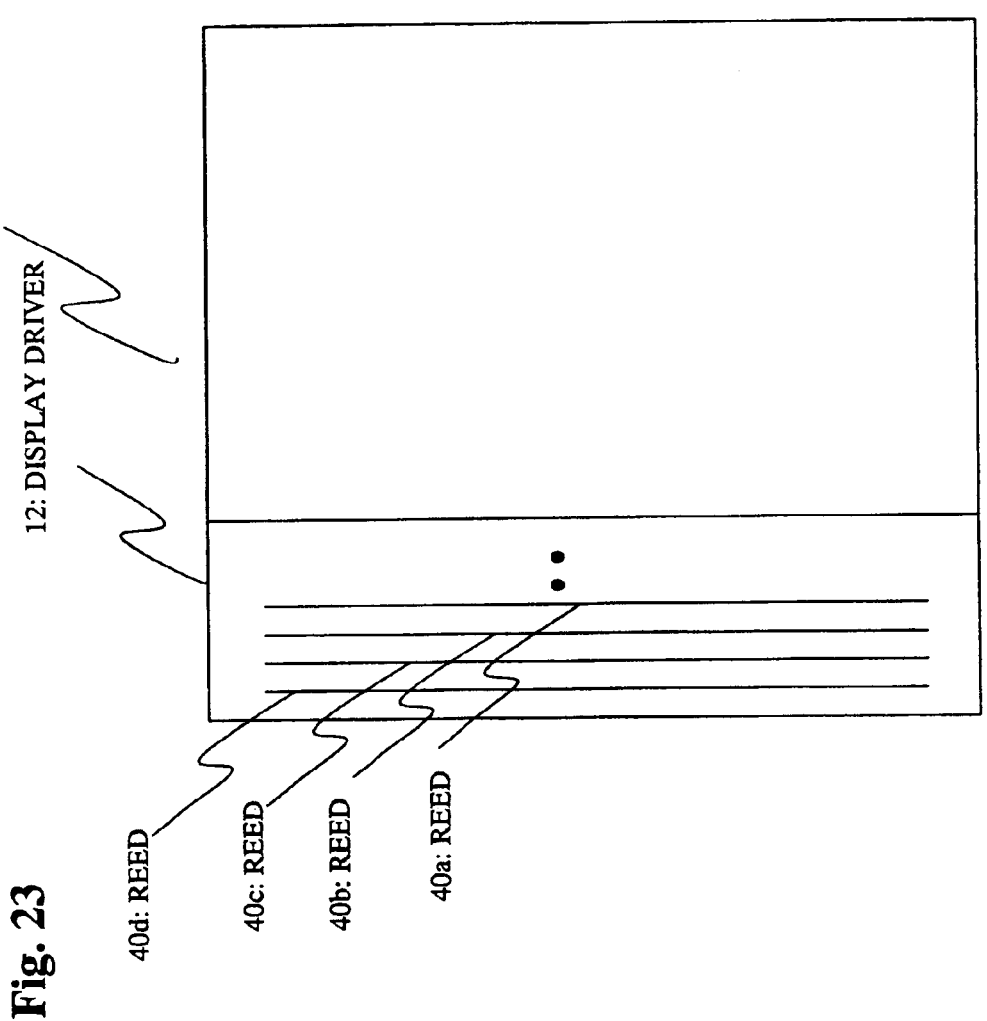
FIG. 23 is a diagram showing a shape of a connecting terminal of an electronic paper.

As shown in FIG. 23, reeds 40 of which numbers is enough to transfer the display-data are provided in the vertical direction in parallel at the end of the electronic paper 101.

Figure 24:
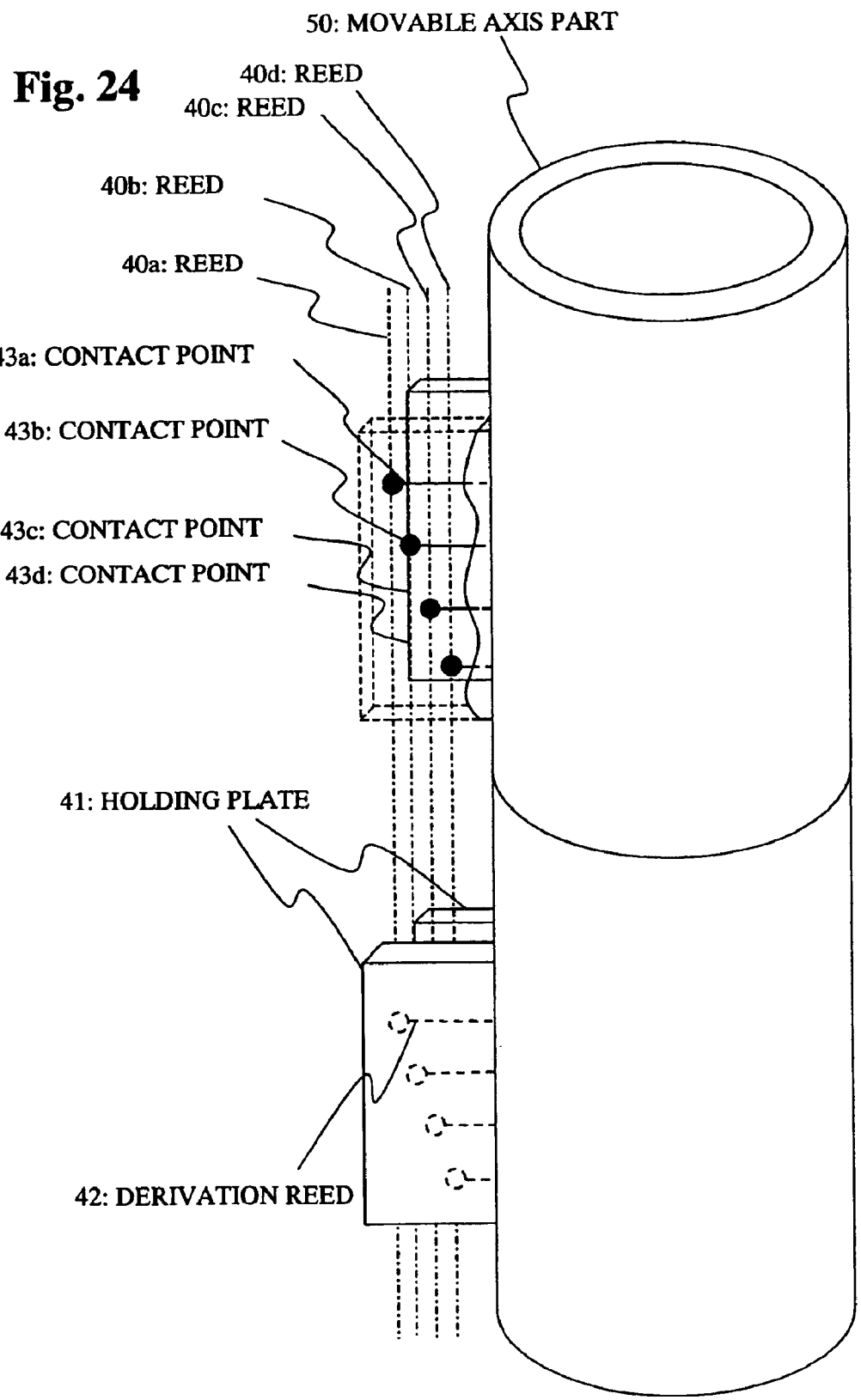
FIG. 24 is a diagram showing a shape of a connecting terminal of a cover.

On the other hand, as shown in FIG. 24, two holding plates 41 for holding the electronic paper 101 elastically so as to catch the thickness of the electronic paper is protruded in the diameter direction of the movable axis part 50. Derivation reeds 42 to contact respective heads of parallel reeds 42 of the electronic paper 101 are provided on the inside of the holding plate 41, and arranged to be introduced to the derivation reeds 42 of the cover.

The numbers of the derivation reed 42 of each connecting terminal 21 is the same as that of the parallel read 40 of the electronic paper. The derivation reed 42 is provided with a contact point 43 of which head is capable of contacting the parallel reed 40. Respective parallel reeds 40*a*, 40*b*, 40*c*, and 40*d*, contact respective contact points 43*a*, 43*b*, 43*c*, and 43*d* by catching the connecting terminal 13 of the electronic paper from both sides with the holding plates of the connecting terminal 21 of the cover. Thereby, the display-data transferred from the first display control means 106 streams to the specific connecting terminals 13 via the contact points 43*a*, 43*b*, 43*c*, and 43*d*.

When the first display control means 106 performs the displaying according to the connecting order ID number notified by the attachable state detecting means 30, the electronic paper 101 may display the connecting order ID number of the connecting terminal 21 to which the electronic paper 101 is attached. If the connecting order ID number is displayed on the electronic paper in this way, the user can see the connecting order ID number even after the electronic paper is detached from the cover 102, in result it is easy for him to discriminate the order of the display-data displayed on the electronic paper.

However, it happens that the display-data is not displayed in the page order in case where the electronic paper 101 attached to a specific connecting terminal 21 is removed and then attached to the different connecting terminal 21. In order to settle this problem, the display-data should be stored in the first storage means 105 of the cover and the attachable state detecting means 30 should monitor the attaching or detaching of the electronic paper 101 at any time.

In other words, as described above, the attachable state detecting means 30 detects whether the electronic paper 101 is attached or detached to or from the connecting terminal 21, and then notifies the first display control means 106 of the connecting order ID number of the connecting terminal to which the electronic paper is attached. Thereby, the first display control means 106 reads the display-data from the first storage means 105, and performs the displaying according to the notified connecting order ID number.

Though the invention is arranged in this embodiment that the display-data be stored in the first storage means 105 of the cover 102, if the display-data is stored in second storage means 105b, 105c, and 105d of the electronic paper 101, it is possible to obtain the same effect. That is to say, if the second storage means 105b, 105c and 105d are provided on the electronic paper 101, the first display control means 106 may obtain the display-data from the second storage means 105b, 105c and 105d, and then perform the displaying as above.

It is needless to say that, in case where the position detecting means 36 is provided in the cover 102, the position detecting means 36 imparts a connecting order ID number to the connecting terminal 21 and notifies the first display control means 106 of the connecting order ID number by being linked with the attachable state detecting means 30.

In addition, in case where the cover 102 is provided with a specific button not illustrated, the attachable state detecting means 30 or the position detecting means 36 may start up when the user presses this button down. Otherwise, when the electronic paper file is powered on or the displaying of the electronic paper is cleared temporarily, the attachable state detecting means 30 or the position detecting means 36 may start up.

Figure 3:
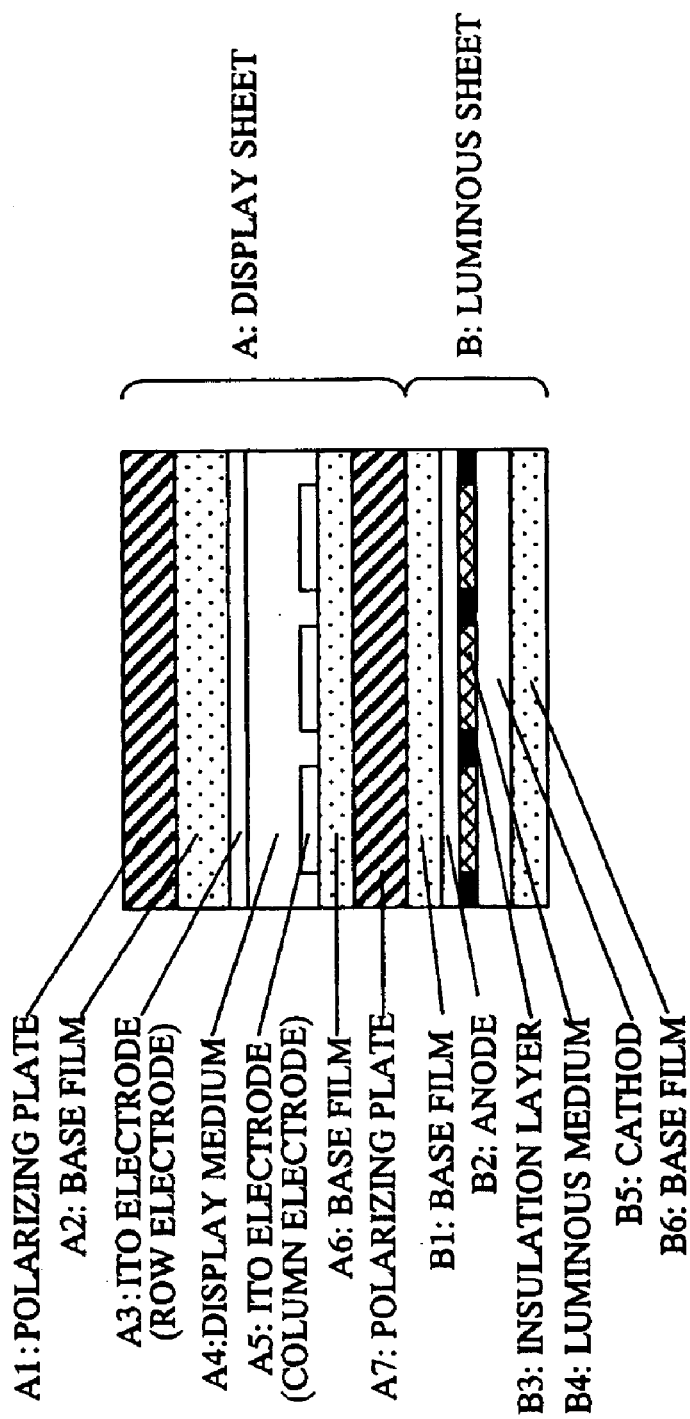
FIG. 3 is a device structure diagram of a display unit of the electronic paper.

The display unit 121 comprises a display sheet A including a specific display medium and a luminous sheet B to irradiate the display sheet A as shown in FIG. 3, of which generating procedures are explained here.

First, the display sheet A is configured as follows. An Indium Tin Oxide (ITO) electrode (row electrode) A3 is formed on an upper base film A2, while an Indium Tin Oxide (ITO) electrode (column electrode) A5 is formed on a lower base film A6. The display medium A4 (for instance, the ferroelectrical high polymer liquid crystal) is applied to the surface of the column electrode A5 in a specific thickness. The row electrode A3 and the column electrode A5 are pasted so as to face each other and form in grid. After the molecules of the display medium A4 are orientated to a specific direction, those are held and pasted from both sides with the polarizing plates A1 and A7. Thereby the display sheet A is prepared.

Meanwhile, since the entire aspect of the luminous sheet B may radiate equally, a common electrode (anode) B2 is formed on the upper base film B1 while a common electrode (cathode) B5 on the lower base film B6. After a luminous medium (for example, an organic electro luminescence) B4 is formed on the common electrode B5 in a specific pattern by means of an insulation layer B3, the luminous sheet B is prepared by pasting the common electrodes B2 and B5 so as to face each other.

Finally, the prepared luminous sheet B is pasted to the below of the display sheet A so as the luminous sheet B irradiates the display sheet A.

Besides, the display medium A4 to be applied to the display sheet A is not necessary to be limited to the above-mentioned nonvolatile material. For instance, it is possible to adopt as the display medium a microcapsule containing the dye material combined with particles having the positive charge, the material combined with particles having the negative charge (of which PH is opposite to the dye material), and so on. The structure of such microcapsule was disclosed in details in PCT Japanese translation publication No. 11-502950.

The black and white displaying of pixels is performed by the matrix control offering the following shutter function. That is to say, when a specific voltage is impressed between the row electrode A5 and the column electrode A3 of the display sheet A, molecules of the display medium A4 are orientated to the direction for which the light is not transmissive (the shutter is ON), and thereby the pixels specified by the row electrode A5 and the column electrode A3 are displayed in black. On the other hand, when the voltage against the specific voltage (which is called "positive voltage") is impressed, the molecules of the display medium A4 are aligned to the direction for which the light is transmissive (the shutter is OFF), thereby the pixels are displayed in white.

Meanwhile, when the voltage is impressed between the common electrodes B2 and B5 of the luminous sheet B, the entire aspect of the luminous medium B4 irradiates the display sheet A. That is to say, the luminous medium B4 is luminous, white pixels (of which the shutter is OFF) that the light can pass by is to be lighted.

Besides, since the luminous medium B4 is formed in a specific pattern as above, the common electrodes B2 and B5 of the luminous sheet B change to individual electrodes in the form of grid (that is to say, a row electrode and a column electrode) and the voltage to be impressed on changes per individual electrode. Thereby it is possible to irradiate only areas to be emphasized such as a title area and so on.

In case of making the luminous sheet B radiate in mono color, the light source of one color may be placed uniformly on the entire aspect of the sheet, while in full colors, the light sources of RGB (Red, Green and Blue) should be placed on the sheet in the form of grid. In case of making the entire aspect of the sheet radiate even in full colors, it is not necessary to change to the individual electrodes but the luminous sheet may have the common electrode B2 and B5.

[EMBODIMENT 1]

In the first place, when the electronic paper file 100 is powered on as fixed and arranged the connecting terminals 21 of the cover, the attachable state detecting means 30 starts up. The attachable state detecting means 30 notifies number-of-pages recognizing means 303 whether the electronic paper 101 is attached or detached on or from the connecting terminal 21.

Figure 4:
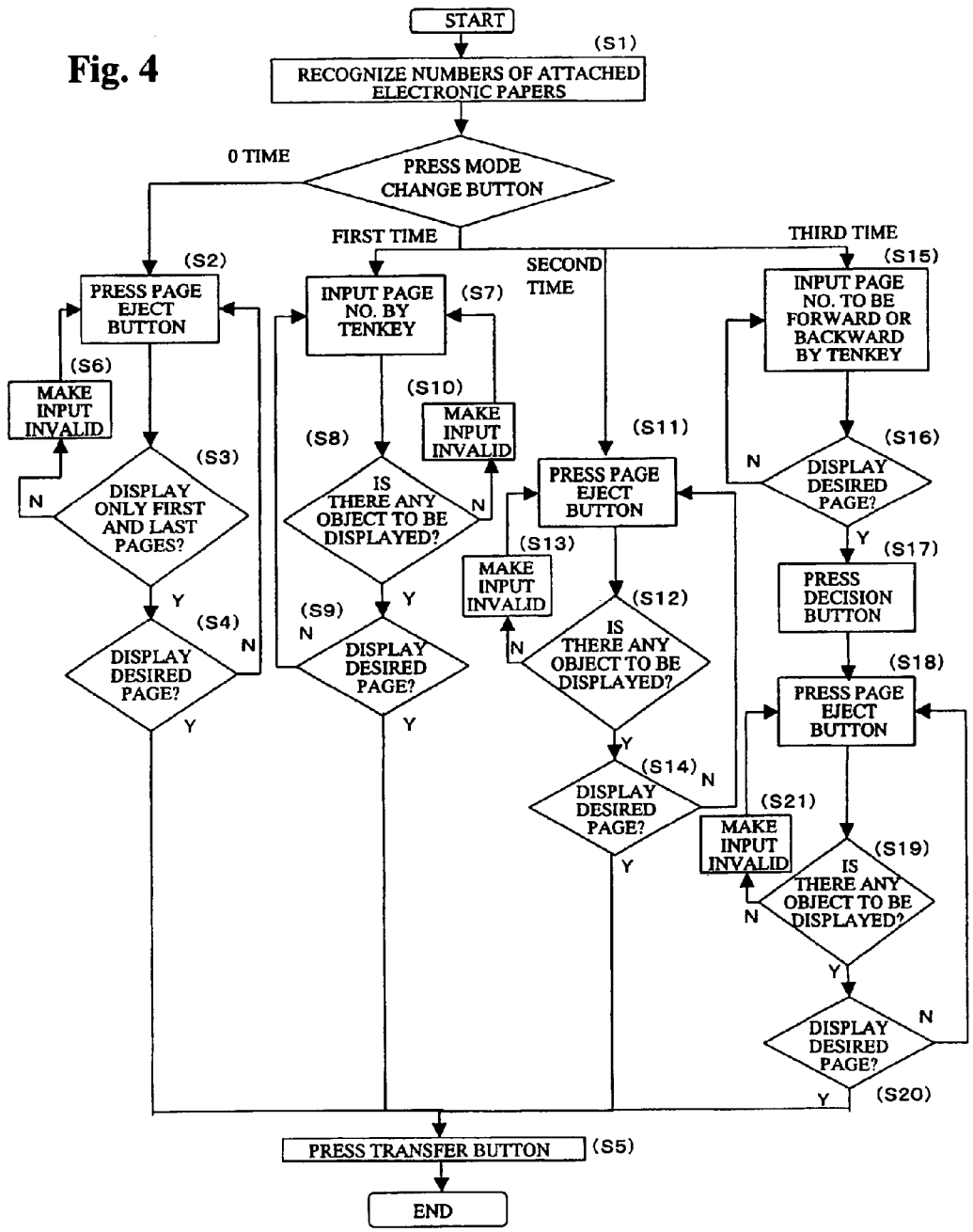
FIG. 4 is a flowchart showing an operation of selecting a page number.
Figure 5:
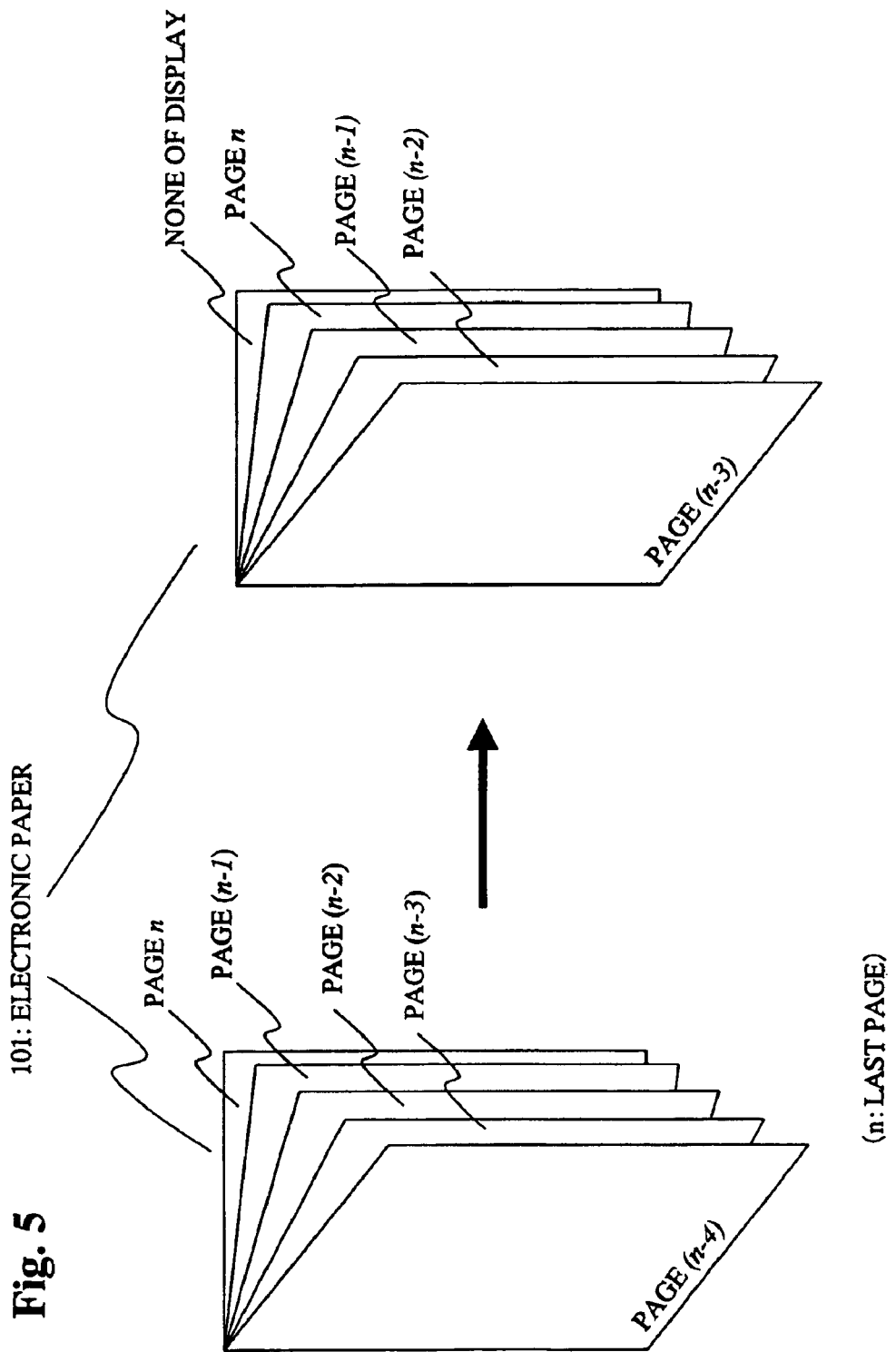
FIG. 5 is a diagram showing a content that is displayed after pressing a page feed button.

In response to the notice from the attachable state detecting means 30, the number-of-pages recognizing means recognizes the number of electronic papers 101 attached to the cover 102 (FIG. 4, S1). Besides, the processing, that the attachable state detecting means 30 notifies the first display control means 106 of the connecting order ID number of the connecting terminal to which the electronic paper is attached, is the same as in the above.

On the other hand, in case where the connecting terminal 21 is connected to the movable axis part 50 as shown in FIG. 15, when the electronic paper file is powered on, the attachable state detecting means 30 and the position detecting means 36 start up. The started attachable state detecting means 30 notifies the number-of-pages recognizing means 303 of the attachable state of the electronic papers 101 and also notifies the first display control means 106 of the connecting order ID number imparted as above.

The invention is explained according to the assumption that the electronic papers are attached to the connecting terminals 21 of the connecting terminal ID Nos. 1 to 5. And it is also assumed that when the electronic paper file is powered on, the first display control means 106 displays the display-data stored in the first storage means 105 on the electronic papers 101 in sequence from the top page.

In other words, when the electronic paper file is powered on, the first display control means 106 displays the first to fifth pages of the display-data on respective electronic papers 101 connected with the connecting terminals of the connecting terminal ID Nos. 1 to 5. Besides, in order to look through the other pages, the desired page number may be displayed on the page number display means 107 by means of a page feed button 302 provided on the page selecting means 108.

In the initial setting, when the page feed button 302 (which comprising an forward key 302a and a backward key 302b, for example) is pressed down one time, the page feed means starts up, and the display-data to be displayed on the display unit 121 is moved forward or backward one page. For instance, while the display unit 121 is displaying pp. 1 to 5, if pp. 2 to 6 are desired to be displayed on the display unit 121, the page feed button 302a is pressed down one time (FIG. 4, S2).

At this time, the page feed means judges whether only the first page or the last page of the display-data is displayed on the electronic paper 101 (FIG. 4, S3). In case of determining that only the first or the last page is displayed, the operation of pressing down the forward key 302a or the backward key 302b gets invalid (FIG. 4, S6). In this case, since the electronic papers 101 display pp. 1 to 5, the pressing of the forward key 302a is valid and then the page number display means 107 displays "2".

In the next place, after the user confirms that "2" is displayed as above (FIG. 4, S4), he presses a transfer button 310 including the page selecting means 108 (FIG. 4, S5). Thereby the page number ("2" in here) displayed on the page number display means 107 is transferred to the first display control means 106.

The first display control means 106 obtains pp. 2 to 6 of the display-data from the first storage means 105, if necessary, converts the data to the dot data and transfers the data to the display driver 122. Thereby it is needless to say that pp. 2 to 6 of the display-data are displayed on the electronic papers 101.

Besides, while pages from (n−4) (n: the last page No.) to (n) are displayed on the electronic papers 101, when the user presses the forward key 302a, the electronic papers 101 display pages from (n−3) to (n). Therefore, one of the electronic papers 101 does not display anything.

The invention of this embodiment is arranged that after the user confirms the content displayed by the page number display means 107, the user presses the transfer button 310, thereby the pages displayed on the electronic papers 101 be moved forward or backward. However, it may be arranged that pressing down the page feed button 302 execute the forward and backward of pages to be displayed on the electronic papers 101 automatically.

In the next place, when a mode change button 301 included in the page selecting means 108 is pressed down, the mode of the page feed button 302 changes and the display mode of the page number changes. At this time, if the user directly input the page number that he wants to browse by means of the tenkey 304 included in the page selecting means 108, the page feed means starts up and performs the following processing (FIG. 4, S7).

Figure 8:
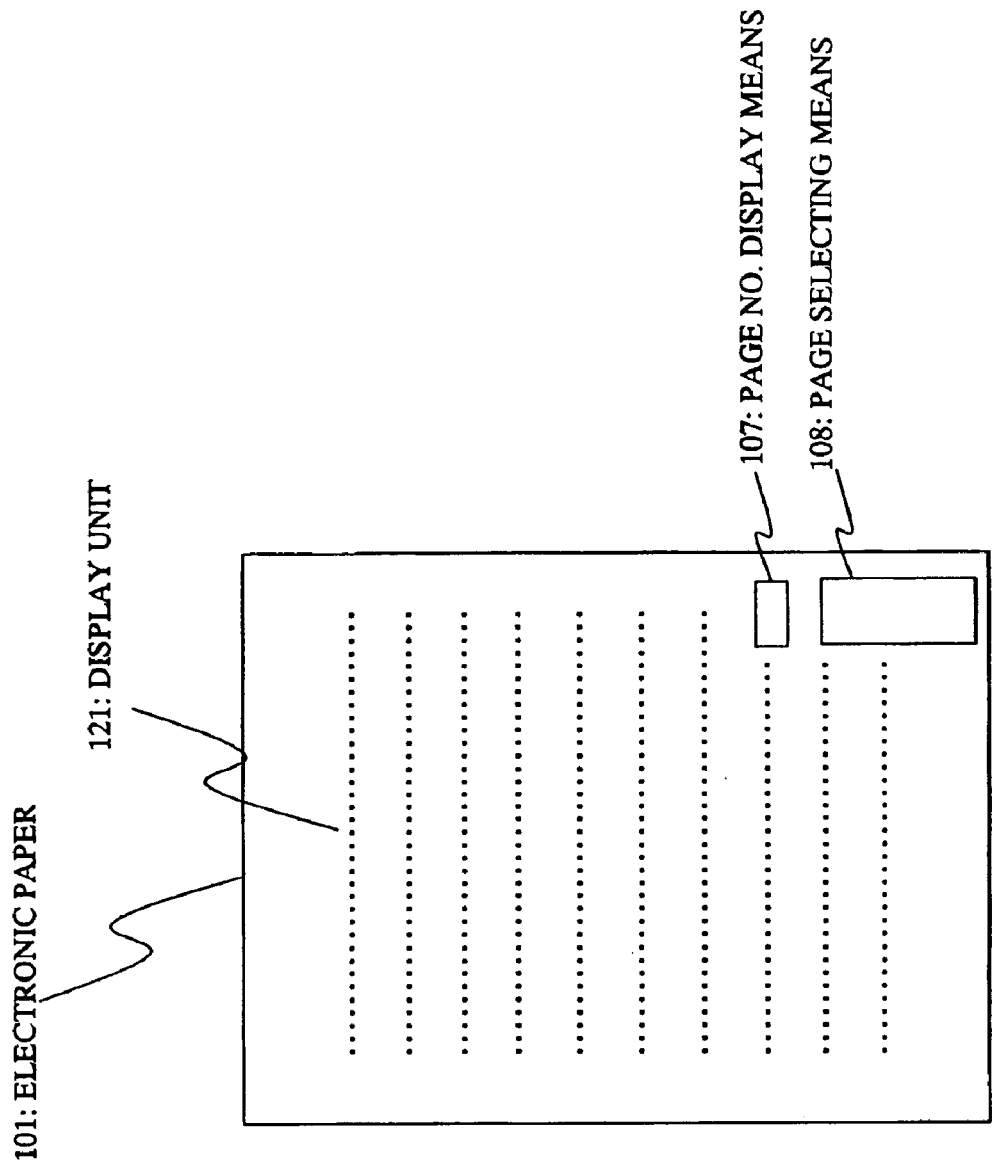
FIG. 8 is a diagram showing a state that an electronic paper is provided with page selecting means.

The page feed means judges whether the inputted page number is n and less or not (FIG. 8, S8). In case whether the inputted page number is n and less, the page number is displayed by the page number display means 107 (FIG. 4, S9). On the contrary, if the page number is more than n, the page feed means makes the inputting of page number invalid (FIG. 4, S10).

After the user confirms that the desired page number is displayed on the page number display means 107, he presses the transfer button 310 (FIG. 4, S5). Thereby the data for 5 pages, the top of which has the page number displayed on the page display means, is transferred to the first display control means 106. After this, the processing until the desired display-data is displayed on the display unit 121 is the same as in case where the page number is selected by the page feed button 302 set at the initial setting, therefore the explanation is omitted here.

In addition, in case of pressing the mode change button 301 twice, the page feed means starts up, subsequently the page feed button 302 is pressed once, the page number of the display-data to be displayed by the electronic paper 101 is moved forward or backward pages as much as the number of attached electronic papers.

That is to say, when the mode change button 301 is pressed twice, the attachable state detecting means 30 starts up and detects the attachable state of the electronic paper 101 of the connecting terminal 21. The number-of-pages recognizing means 303 recognizes the number of the attached electronic papers on the basis of the informed attachable state.

Subsequently, when the page feed button 302 is pressed once (FIG. 4, S11), as moved the page displayed at this moment forward or backward the number of attached electronic papers (5 pages in this embodiment), the page feed means judges whether there is any pages to be an object of the displaying (FIG. 4, S12). When it is determined that there is pages to be displayed, after moving the page forward or backward as much as the number of attached electronic papers, the page number display means 107 displays the page number of the page displayed on the first electronic paper 101. On the other hand, if it is determined that there is no page to be displayed, the pressing of the page feed button 302 gets invalid by the page feed means (FIG. 4, S13).

After the user confirms that the desired page number is displayed on the page number display means 107, if he presses the transfer button 310 (FIG. 4, S14 to S5), the data for 5 pages, the top of which has the page number displayed on the page display means, is transferred to the first display control means 106. The processing after that till the desired display-data is displayed on the display unit 121 is the same as in the case where the page number is selected by means of the page feed button 302 set at the initial setting, therefore the explanation is not described here.

As described above, it is arranged in the embodiment that in result of pressing the page feed button 302 once, the succeeding pages to the page displayed at this moment are displayed on the display unit 121, therefore the user can browse the display-data speedy.

In addition, when the mode change button 301 is pressed down three times, the page feed means starts up. Under such condition, the page feed button 302 is pressed down one time, the user can select the number of pages to be moved forward or backward by means of the tenkey 304 (FIG. 4, S15). The page number selected in this way is displayed on the page number display means 107 (FIG. 4, S16), so that the user can confirm the desired page number was selected, and then he presses a decision button 311 included in the page selecting means 108 (FIG. 4, S17). The subsequent processing (FIG. 4, S18 to S19 to S20 to S5, S18 to S19 to S21) is essentially the same as the prescribed operations (FIG. 4, S11 to S12 to S14 to S5, S11 to S12 to S13), therefore the detailed explanation is not described here.

Besides, the page number to be moved forward or backward by pressing the page feed button one time may be within or outside the scope of the number of the attached electronic papers 101. That is to say, if the page number moved forward or backward by pressing the page feed button one time is within the cope of the number of the attached electronic papers 101, the user can browse these pages comparing the new displayed page and a part of the prior displayed pages. On the other hand, if the page number moved forward or backward by pressing the page feed button one time is outside the scope of the number of the attached electronic papers 101, the user can move the pages forward or backward speedier than that in the prescribed case.

Figure 6:
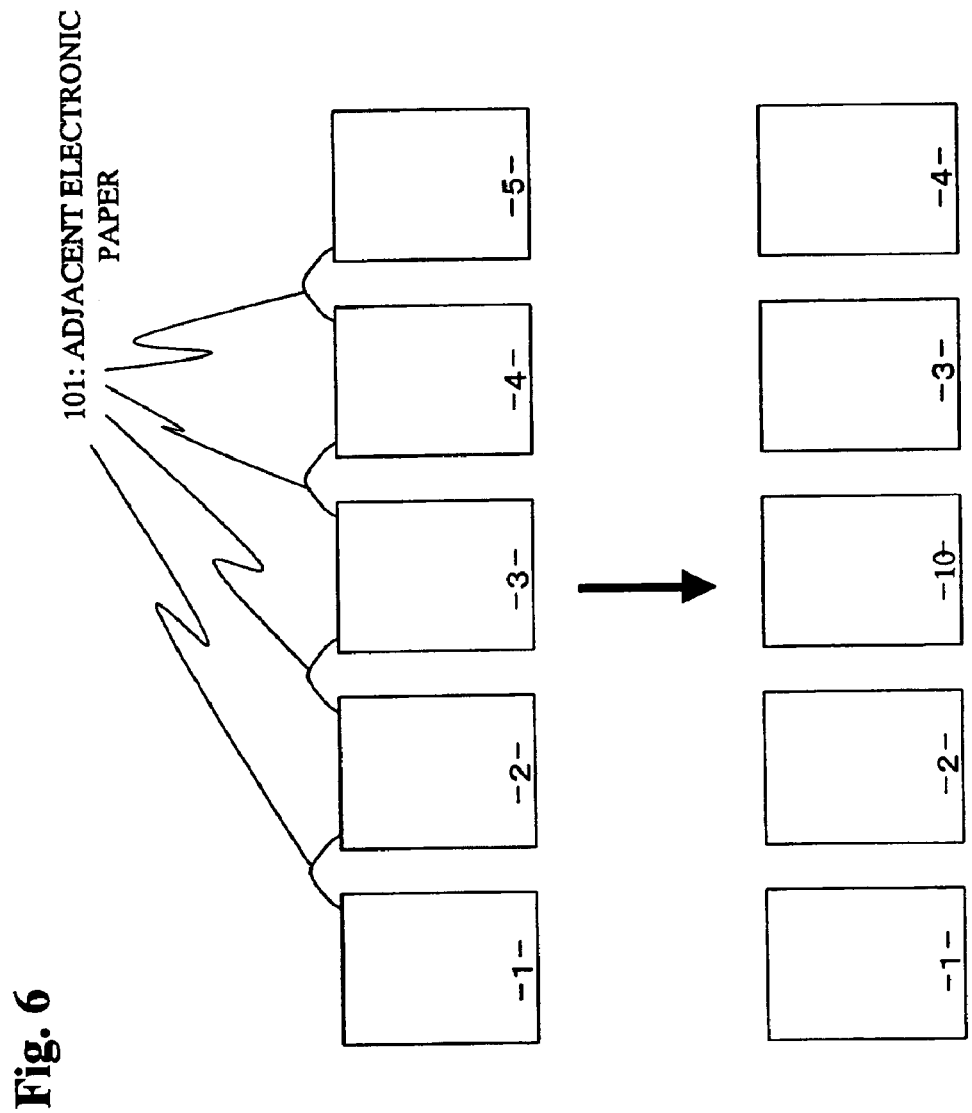
FIG. 6 is a diagram showing a state of displaying specific display-data on a specific electronic paper.

By the way, when the user wants to look and compare a page displayed at this moment and a page not continued to this page, the following procedure is executed. Thereby it is easy for the user to compare them by displaying those pages on adjacent electronic papers 101 as shown in FIG. 6.

Figure 7:
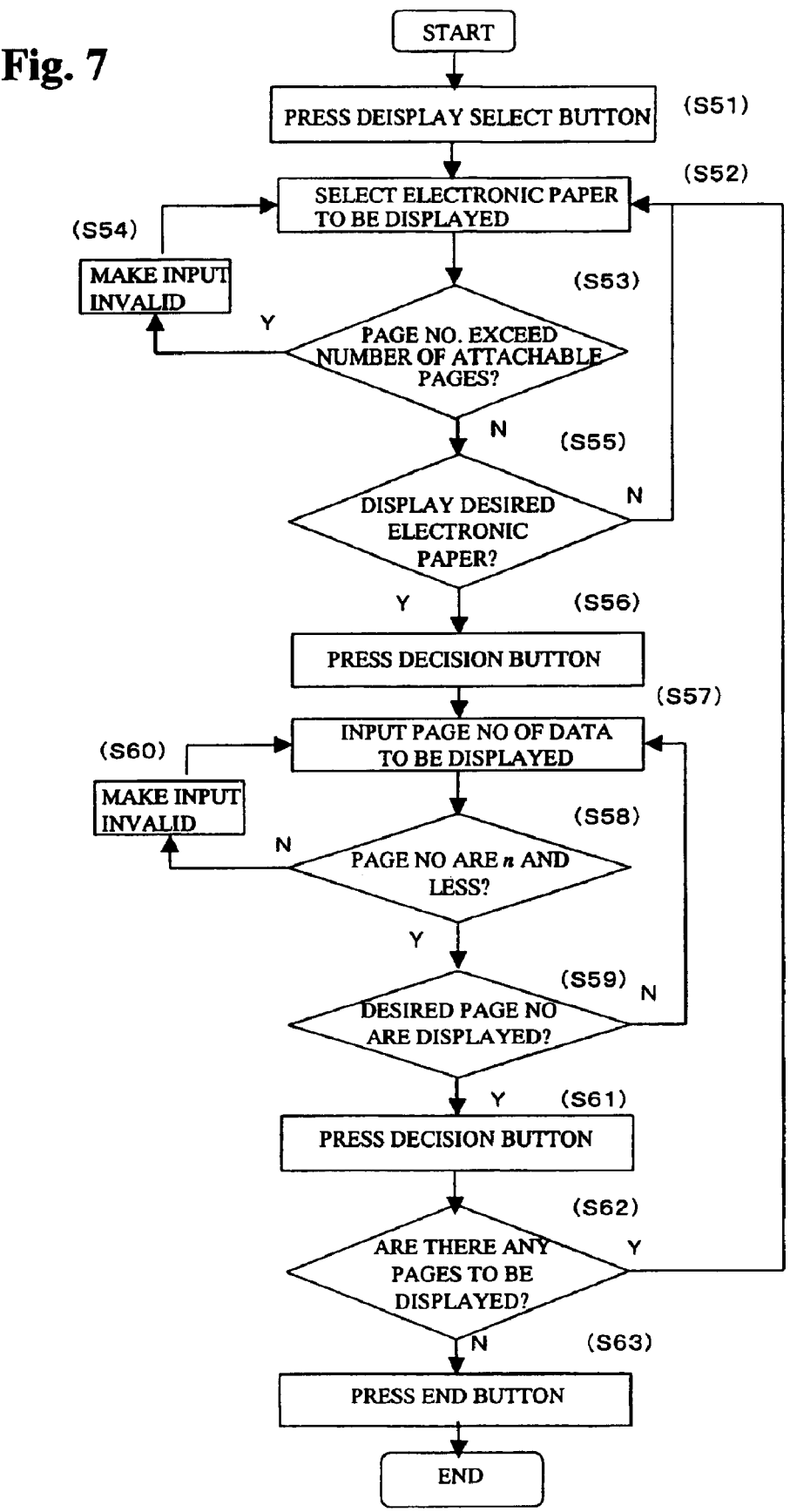
FIG. 7 is a flowchart showing an operation of displaying specific display-data on a specific electronic paper.

When the display select button 305 included in the page selecting means 108 is pressed down, the display selecting means starts up. And the user can select the page of the electronic paper 101 to display the display-data by means of the tenkey 304 (FIG. 7, S52). It is needless to say that the invention may be arranged that pressing the mode change button 301 four times can offer the same function as pressing the display select button 305, for example.

Next, the display selecting means judges whether the selected page number exceeds the number of the attached electronic papers 101 or not (FIG. 7, S53). When it determines that the selected page number exceed the numbers of the attached electronic papers 101, the display selecting means makes the page selecting operation invalid (FIG. 7, S54), meanwhile when it determines that the selected page number do not exceed the numbers of the attached electronic papers 101, the selected page number is displayed on the page number display means 107 (FIG. 7, S55).

Accordingly, after the user confirms that the desired page number of the electronic papers 101 is displayed on the page number display means 107, he presses the decision button 311 (FIG. 7, S56), thereby the page of the electronic paper 101 to display the display-data is determined.

When the page number of the display-data to be displayed is inputted from the tenkey 304 (FIG. 7, S57), the display selecting means judges whether the inputted number is n and less (FIG. 7, S58). If it determines that the number is n and less, the inputted number is displayed on the page number display means 107 (FIG. 7, S59), meanwhile if determines that it is not n and less, the operation of inputting page number gets invalid (FIG. 7, S60).

At this time, if the page number display means 107 displays the desired page number, the user presses the decision button 311 (FIG. 7, S61). Thereby, the desired page of the display-data is to be displayed on the specified electric paper 101.

Subsequently, in order to display the other page of the display-data on the other electronic paper, the user presses the display select button 305 (FIG. 7, S51). Besides, since the succeeding processing is the same as the above, the detailed explanation is omitted here.

Finally, at the time of pressing the end button 306 included in the page selecting means 108 (FIG. 7, S63), the first display control means 106 obtains the display-data from the first storage means 105, if necessary, after converting the data to the dot data, transfers the data to the display driver 122 of the electronic paper 101.

Likewise, if the user wants to compare a page displayed at this moment and a page not consecutive to this page, those pages can be displayed on the electronic papers 101 adjacent each other. Besides, when the specific pages are displayed on the adjacent electronic papers 101, pages to be displayed on the other electronic papers 101 are not limited particularly. That is to say, as shown in FIG. 6, when page 2 and page 10 of the display-data are displayed on the adjacent electronic papers 101, it may be arranged that page 3 and page 4 follow to page 10, otherwise page 11 and page 12 follow to page 10.

As described above, in case where the invention has stored the desired display-data in the storage means of the electronic paper file, even if the user does not carry the storage medium such as a flash memory, CD-ROM or the like, or even under the circumstances that the connection of the Internet cannot be performed, the user can browse the desired display-data.

In addition, even in case where the enormous page number of electronic papers are not attached to the electronic paper file, the invention can display the entire data of the enormous size of data like the encyclopedia or the theses on the electronic paper. Therefore, it is possible to improve the operating performance of the electronic paper file.

Moreover, since the invention is arranged that since not only the cover but also the electronic paper be provided with sending-receiving means, it is easy to cope with a case where the standard of the specific storage medium changes. That is to say, even if the specific storage medium changes in the standard, only one electronic paper corresponding to the standard is provided, thereby it is possible to browse the display-data of the storage medium.

Besides, in case where the first storage means 105 does not stores the display-data, the display-data may be obtained from a storage medium storing the display-data or the Internet via the sending-receiving means 104. It is needless to say that thus obtained display-data is preferable to be inputted and stored in the first storage means 105.

In the above explanation, the page number display means 107 is arranged so as to display the page number selected by the page feed button 302 or the tenkey 304, however, the invention is not restricted to this. That is to say, the page number display means 107 may display the number of all pages of the display-data to be displayed on the electronic paper file 101.

Furthermore, though the above explanation does not refers particularly, in case where the page numbers selected by the page feed button 302 or the tenkey 304 exceed total page numbers of the display-data, it may be arranged that the alarm or the message be outputted in order to inform the user.

[EMBODIMENT 2]

The invention of this embodiment is the same as in the embodiment 1 regarding that the selected page by the page selecting means 108 is displayed on the display unit 102 of the electronic paper, however, the difference from the first embodiment is that the page selecting means 108 is not provided on the cover 102.

That is to say, the page selecting means 108 is provided at the end of the electronic paper 101 as shown in FIG. 8 (at the position of hand holding the electronic paper file 100 or the electronic paper 101). Even under this arrangement, the method of selecting page numbers by mean of the page selecting means 108 is the same as in the embodiment 1.

However, there is a merit in this embodiment that the page feed is made possible by moving a finger as held the electronic paper file 100 or the electronic paper 101. Additionally, if the page selecting means 108 is provided on a surface of the display unit 121 not displaying the display-data (a backside etc.), the user can turn pages only by moving the forefinger.

Moreover, if the page number display means 107 is provided on the electronic paper 101, the user can confirm whether the exact page is selected without moving his eye from the electronic paper and it does not tax the eyes. Therefore, the user can browse the display-data concentrating his attention to his work.

Further more, the invention may adopt the following technology as the page selecting means 108.

For instance, the display unit 121 of the electronic paper 101 may adopt the digitizer function and the handwritten character recognizing means. That is to say, the desired page number is written on the display unit 121 by a specific writing material or a finger, and the traced position is recognized by the digitizer function. According to the position recognized in this way, the handwritten character recognizing means recognizes the characters. In result, the page number is recognized.

Otherwise, in case where the electronic paper 101 is provided with a software keyboard function, the function may be utilized as the page selecting means 108.

In addition, the electronic paper file 100 may be provided with means for connecting an external terminal such as a mobile phone. According to such configuration, the desired page can be selected by the tenkey included in the external terminal.

Likewise, the electronic paper file 100 may be provided with the wireless communication function. According to such configuration, the desired page number can be selected by means of tenkey of a portable terminal including the wireless communication function that is away from the electronic paper file.

[EMBODIMENT 3]

Figure 9:
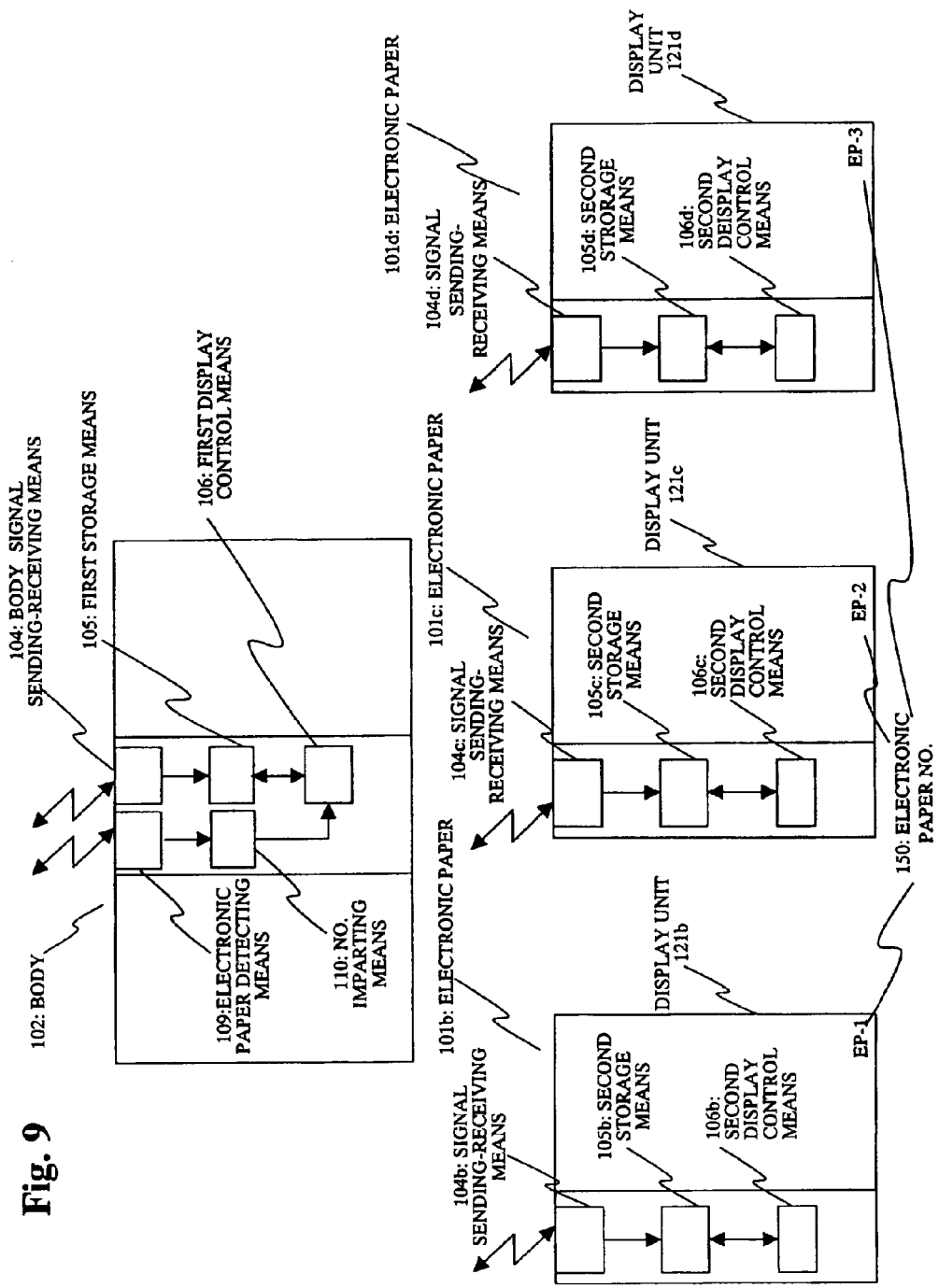
FIG. 9 is a diagram showing a state that an electronic paper is separated from a cover physically.

The invention of this embodiment is arranged as shown in FIG. 9 that the display-data desired by a user be displayed on the electronic paper 101 that is not connected physically with the cover 10. This case is explained here.

First of all, when the user powers the cover 102 on, the electronic paper detecting means 109 of the cover 102 is arranged so as to output signals (electric waves, ultrasonic waves, or etc.) based on a communication source operated by remote control automatically or according to the user's instruction. Meanwhile, each electronic paper 101 is also arranged so as to return necessary signals to the cover 102 according to the instruction of the cover 102 or the state of itself.

The correlation between a specific cover 102 and an electronic paper 101 to be applied to the cover 102 has stored in advance in the first storage means 105 and respective second storage mines 105*b*, 105*c*, and 105*d* of each electronic paper 101*b*, 101*c*, and 101*d*. It is assumed that the correlation be executed by imparting ID number to the cover 102 and each electronic paper 101*b*, 101*c* and 101*d*.

Besides, the ID number may be the connecting terminal ID number, or the product number stored in ROM if the electronic paper is provided with the ROM. Such correlation is performed so that the electronic paper 101 used in the relation with a specific cover 102 will not react electric waves generated from the other cover 102 indiscriminately.

In the under mentioned explanation, it is assumed that after or before the electronic paper file 100 is powered on, each electronic paper 101*b*, 101*c*, and 101*d* is detached from the connecting terminal of the cover 102. A case that electric waves are used as a communication resource is taken as an example. The electric waves to be used in this embodiment are in conformity with the standard such as Bluetooth, for example.

After the electronic paper file 100 is powered on, or before any one of electronic paper 101 is detached from the cover 102 or attached to the cover 102, the cover 102 obtains ID number of each electronic paper 101 on the basis of the correlation. Besides, it is assumed here that the electronic paper detecting means 109 could detect the ID numbers of three electronic papers 101*b*, 101*c* and 101*d*.

Next, number imparting means 110 imparts electronic paper numbers 150 (from EP1 to EP3) to respective electronic papers 101*b*, 101*c* and 101*d* on the basis of the ID numbers detected by the electronic paper detecting means 109. Besides, a method for allocating the electronic paper number 150 (EP) may be to impart to the electronic paper the electronic paper No. 150 in order in which the character code of ID number is smaller, that is to say, in sequential order from 1. In case where the connecting terminal ID number is adopted as the ID number, the connecting order ID number can be adopted as the electronic paper number 150 in this embodiment.

Under the condition that the cover 102 is connected electrically with the electronic papers 101*b*, 101*c* and 101*d*, the electronic paper detecting means 109 notifies the first display control means 106 that three electronic papers were detected. Thereby, the first display control means 106 obtains from the first storage means 105 specific display-data for three pages from the first page, for example.

Subsequently, the first display control means 106 in this embodiment sends the display-data corresponding to the first page of the obtained display-data to the electronic paper 101 of the electronic paper number 150 (EP1) (which is the electronic paper 101*b*) via the sending-receiving means 104. That is to say, the first page of the display-data is sent out.

Likewise, the first display control means 106 sends the second and third pages of the display-data to the electronic paper 101 of the electronic paper number 150 (EP2, EP3) in sequence. Besides, in order to transfer the display-data of the cover 102 to the desired electronic paper 101 that is not connected with the cover 102 physically, the following procedure is adopted.

The ID number of each electronic paper 101 correlated as above has been stored in the page selecting means 108 of the cover 102 in advance, and then a user selects as a desired destination one out of the electronic paper 101 storing the ID number by means of button.

The specific display-data of the first page sent from the first display control means 106 is received by the sending-receiving means 104*b* of the electronic paper 101*b*. The specific display-data of the first page received by the sending-receiving means 104*b* is stored in the second storage means 105*b* of the electronic paper 101*b*, and read out by the second display control means 106*b* of the electronic paper 101*b*. The second display control means 106*b*, if necessary, converts the specific display-data of the first page to the dot presentation, and displays the data on the display unit 121*b* of the electronic paper 101*b*. Likewise, the display-data of the second and third page is sent from the first display control means 106 to the electronic papers 101*c* and 101*d* respectively, which is displayed on the display units 121*c* and 121*d* of the electronic papers 101*c* and 101*d*.

In addition, if the user uses the page feed button 302 including the page selecting means 108 described in embodiment 1 or 2, it is possible to display the display-data that the user wants to display out of the display-data consisting of more than 4 pages on the three electronic papers 101*b*, 101*c* and 101*d*.

For instance, when these three electronic papers 101*b*, 101*c* and 101*d* display pages from 1 to 3 of the display-data, the user wants the electronic papers 101*b*, 101*c* and 101*d* to display pages from 2 to 4 of the display-data. Regarding such case, the explanation is made hereunder.

First, the user presses the page feed button 302*a* and then presses the transfer button 310. In result, the first display control means 106 obtains the display-data for pages from 2 to 4 from the first storage means 105 as described in embodiment 1. And while the first display control means 106 sends the display-data corresponding to the top page (in this case, the second page of the display-data) to the electronic paper 101*b*, it sends the display-data of pages from 3 to 4 to the electronic paper 101*c* and 101*d* respectively.

In such case, the contents of the display-data are not taken into consideration, however, the display-data may be transferred on the basis of an ID number of the electronic paper 101 or an writing ID specifying the content of the display-data displayed on the electronic paper 101 (such as the file name or the page number of display-data). For instance, in case where the writing ID expresses a type of the electronic library, the cover 102 is arranged so as not to transfer the display-data to the electronic paper 101 that is displaying a type of the electronic library different from the one stored in the first storage means 105.

In addition, the second storage means 105*b*, 105*c* and 105*d* can be utilized as an extension memory of the first storage means 105. For instance, in case where mass display-data is obtained through a storage medium or the Internet, such display-data sometimes cannot be sorted in the first storage means 105. In this case, the data that cannot be stored in the first storage means 105 may be arranged so as to be stored in the second storage means 105*b*, 105*c* and 105*d*.

Moreover, when the display-data is obtained through the storage medium or the Internet as above, it may be arranged that the user be able to select either one of the first storage means 105 or either one of the second storage means 105*b* to 105*d* to store the display-data. Otherwise, according to the user's selection, the display-data may be stored in a plurality of storage means.

26/01

Further more, when the user presses a push-button provided on the cover 102 (which is not shown in the drawing), the electronic paper detecting means 109 may detect an ID number of the electronic paper.

[EMBODIMENT 4]

The electronic paper file of this embodiment is configured so as to be a portable and notebook type, which is different from the conventional display device represented by the display. Therefore, the way to use a document to be an object of the browsing or editing can be expected to change. That is to say, it has been general that the object document is displayed or edited by a personal computer, which is printed on papers in order to carry them. Meanwhile by using the electronic paper, the object document is stored in it, and the electronic paper itself is carried.

In such utilization, the electronic paper is expected to be able to perform the editing like the notebook made of paper (which is called "notebook" simply) in which the user can write (edit). The editing in this embodiment is to show the reading in Kana and write notes into character data, and to insert (overwrite) or move images that cannot be managed by character codes.

However, the character data is closely correlated with the write data as well as the character with the Kana. Therefore, at the editing (particularly at the time of the moving), there is a need to process the character data and the write data (image data) in parallel.

In addition, since the electronic paper file is provided with a plurality of electronic papers, when the data displayed on a specific electronic paper is edited, the edited contents must be reflected on the other electronic papers that are displaying data closely correlated with the edited contents at the same time.

Therefore, the invention of this embodiment adopts the following means in order to provide the electronic paper file in which a specific editing can be reflected on a plurality of electronic papers and it is possible to edit closely correlated characters and image data at the same time, and it is easy to operate the editing of each page.

Figure 29:
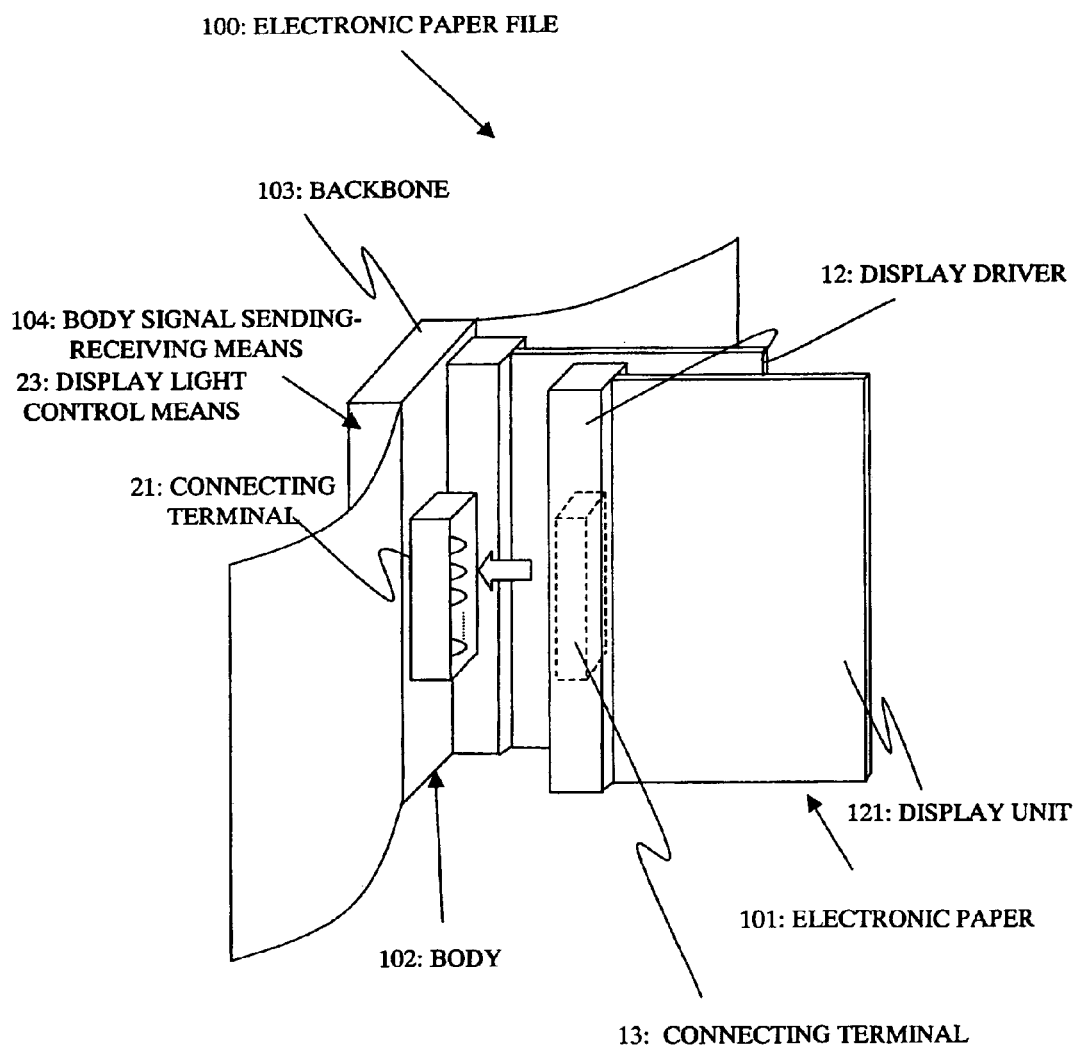
FIG. 29 is a diagram showing an outline structure of an electronic paper file.

As shown in FIG. 29, the electronic paper file 100 in the embodiment is configured that the cover 102 provided with the sending-receiving means 104 and the display light control means 23 on the spine board 103 is connected electrically and physically with electronic papers 101 provided with the display driver part 12 and the display unit 121. The display light control means 23 in the embodiment transfers the display-data received from the sending-receiving means 104 to the electronic paper 101 as a specific bit of data, and controls the light of the luminous sheet B. The other components are the same as those in the embodiments 1 to 3, which is not explained in details here.

Figure 25:
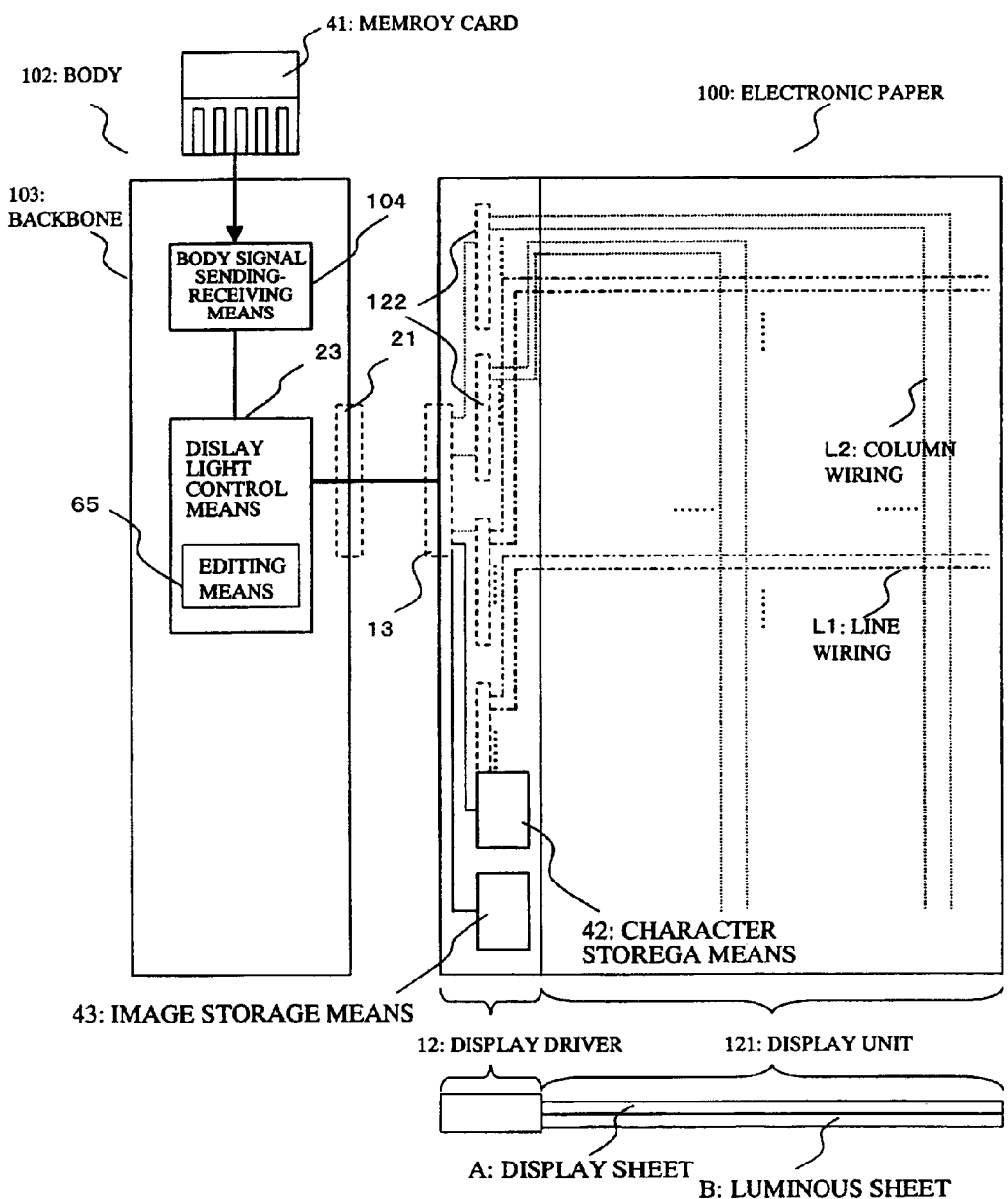
FIG. 25 is a block diagram showing an outline of an electronic paper of the invention.

According to FIG. 25, the arrangement that the display-data is displayed on the display unit 121 is explained hereafter.

When a memory card 41 storing the display-data is connected with the sending-receiving means 104, the display-data is read out by the sending-receiving means 104 and then transferred to the display light control means 23. Thereby, the display light control means 23 divides the display-data into the character data and the image data, and then stores said data temporarily in the character storage means 42 and the image storage means 43 respectively.

Besides, the character data is the character code such as ASCII code and etc. while the image data is data of bitmap, for example. The dividing method into the character data and the image data is determined depending on a type of the display-data; accordingly the explanation is not made here.

Next, the display light control means 23 converts the character data stored in the character storage means 42 to pixel data, which is changed to bit data for the displaying by adding the position data. And the data is sent to the display driver 122 comprising the electronic paper 101.

Besides, the pixel data consists of color data and density data corresponding to each pixel composing the display unit 121. The position data is expressed by the address of each pixel composing the display unit 121, for example, by the x coordinate (L1: a raw wiring) and the y coordinate (L2: a column wiring).

At receiving the display-bit-data, the display driver 122 recognizes the pixel information of the display-bit-data and the position of the pixel by decoding the pixel data and the position data from the display-bit-data. Subsequently the display driver 122 outputs the voltage corresponding to the decoded pixel data to respective raw wiring L2 and the column wiring L1 corresponding to the decoded pixel data, and displays the character data on the specific position of the display unit 121.

Likewise, the display light control means 23 converts the image data stored in the image storage means 43 to the pixel data and adding the position data to said data. By sending the data to the display driver 122 comprising the electronic paper 101, the image data is displayed as well as the character data.

If the display driver part 12 of the electronic paper 101 is provided with the character storage means 42 and the image storage means 43 as described above, even when the electronic paper is detached form the cover 102, it is possible to manage the character data and the image data on the electronic paper 101 independently. However, the character storage means 42 and the image storage means 43 is not always necessary to be provided on the electronic paper 101, but may be provided on the cover 102. In addition, the inputting (editing) to the character storage 42 and the image storage 43 should be reflected on the memory card 41, thereby the object display-data could be edited.

In the next place, the following explains about the inputting (editing) of the character data and the image data on the electronic paper.

Figure 30:
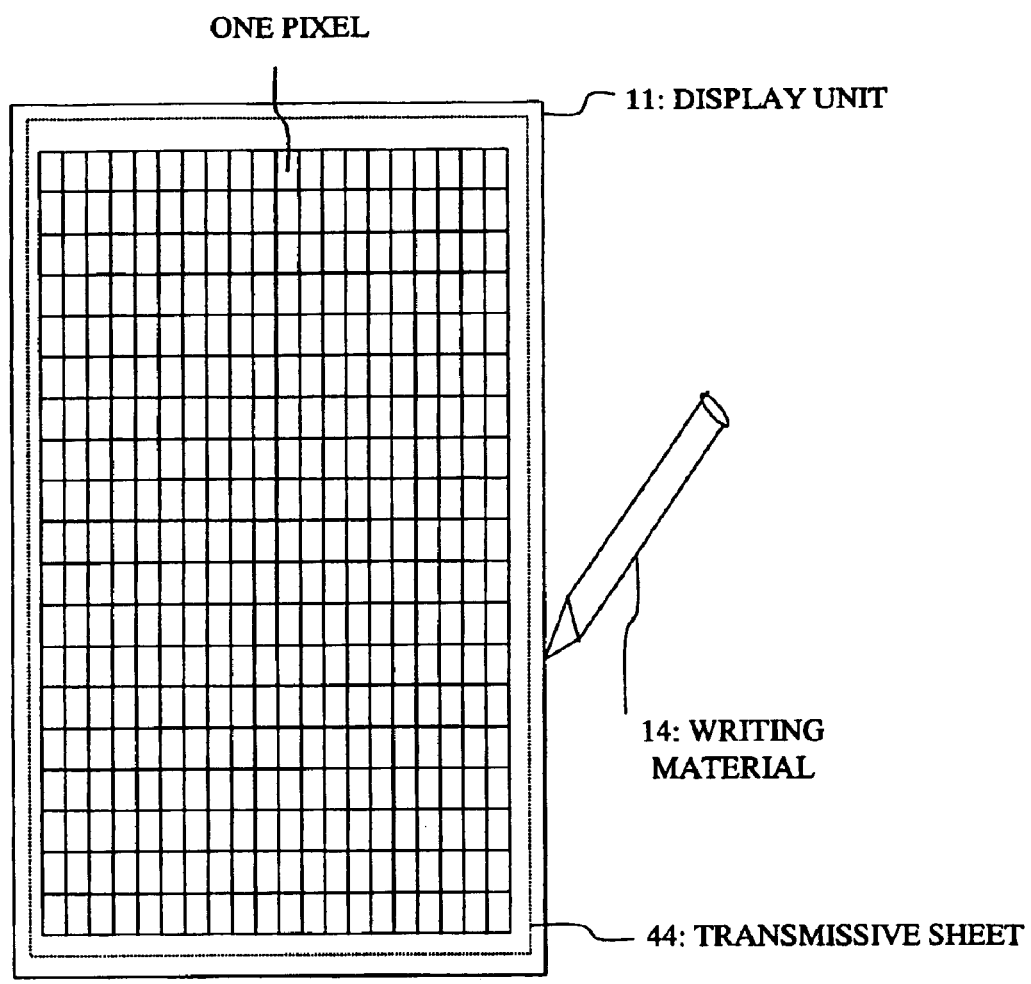
FIG. 30 is an image view of the operation that an electronic paper is edited by means of a writing material and a transmissive sheet.

In order to edit the content displayed on the electronic paper 101, a transmissive sheet 44 can be used as shown in FIG. 30. The transmissive sheet 44 is the coordinate detecting means adopting the electromagnetic induction type or the electrostatic coupling type used by a tablet, a digitizer, or a touch panel.

That is to say, the electronic paper 101 shown in FIG. 30 is provided with the transmissive sheet 44 including the digitizer function (that is to say, the transmissive sheet 44 offers a function capable of detecting the position touched by a writing material) on a surface of the display unit 121. Thereby, when the user illustrates his desired characters or pictures on the transmissive sheet 44 by the writing material (such as a pen like a sharp pointed thing), the transmissive sheet 44 detects the contact point of the writing material and the transmissive sheet 44, and the position is sent to the display light control means 23.

However, if it is possible to specify the position like the above, it is not always necessary to use the digitizer function. For instance, specifying the position by using a pointing device like a mouse can obtain the same effect.

The display light control means 23 updates the image data stored in the image storage means 43 on the basis of the color data and the density data corresponding to the editing content and the position data of pixel corresponding to the position of contact point. Besides, the editing content in the embodiment is that of colors, density, expressing method, and etc. that were predetermined by the user to write in, (the expressing method is to image those written by a brush or a pen).

The processing after that is the same as the case where the image data is received from the sending-receiving means 104.

According to the input processing as above, it is possible to update the image data stored in the image storage means 43 and the displaying on the display unit 121.

When the character data is inputted, the user has to specify the position to input previously by using the writing material. The position specified in this way is sent to the display light control means 23 from the transmissive sheet 44 as mentioned above.

Next, when the user inputs a specific character by using a software keyboard or a keyboard connected separately, the display light control means 23 receives this inputted data as the character data. The received character data is inserted to the character data stored in the character storage means 42 according to the information of position specified as above.

After that, in the same way of the case that the image data is received from the sending-receiving means 104, the displaying of the electronic paper 101 is updated. Besides, the processing to reflect the image data and the character data on each storage means is the control of storage means, and has nothing to do with the invention, therefore the detailed explanation is omitted here.

Accordingly, it is possible to edit directly the display content on the electronic paper. Additionally, since the character storage and the image storage are provided on the electronic paper, even when the electronic paper 101 is detached from the cover, it is possible to retain the character data and the image data as the independent electronic data.

Referring to FIG. 25, FIG. 26(*a*) and FIG. 26(*b*), the deletion (editing) of the character data and the image data on the electronic paper 101 is explained.

FIG. 26(*a*) shows the electronic paper file 100 simply. The electronic paper file is provided with three electronic papers 54 to 56. The electronic papers 54 to 56 offers the same function as the electronic paper 101 shown in FIG. 25. It is arranged that each electronic paper 54 to 56 is provided with respective character storage means 54-2, 55-2, and 56-2 and image storage means 54-3, 55-3, and 56-3, and the character data and the image data corresponding to consecutive pages are displayed on respective display unit. FIG. 26(*b*) shows an image of inside of the character storage means 55-2.

In case where the user deletes the character data, he first specifies an area 60 including the character data as described hereafter. When the area 60 is specified on the electronic paper 55, the upper left point 61 of the area 60 is pushed by the writing material 41. As pushed the transmissive sheet 44, the writing material 14 drags to the lower right point 62. In result, the display unit 121 displays a rectangular area 60 having a diagonal line connecting the points 61 and 62. After the writing material 14 is detached from the point 62, the area 60 is determined. The position data of pixels at the points 61 and 62 is transmitted to the display light control means 23.

In the under mentioned explanation, an area positioned on the upper side of this specified area 60 is called "an area 70" while that on the under side is "an area 71".

The display light control means 23, at the time of recognizing the area 60, refers to the character storage means 55-2 corresponding to the area 60, and obtains the character data included in the area 60.

Next, if the user select "delete" from the editing menu displayed on the electronic paper 55, the editing means comprising the display light control means 23 deletes the character data corresponding to the area 60 (the area M60 in FIG. 26(*b*)) from the character storage means 55-2.

Though the specific data in the character storage means 55-2 is deleted according to the above procedure, the following processing may be executed after the delete processing.

That is to say, when the deleted area 60 is left as a blank space, the editing means 65 may insert line feed codes as much as lines corresponding to the deleted area 60 after the character data corresponding to the area 70 stored in the storage means 55-2. In addition, the blank data is inserted as much as the area corresponding to the deleted area 60 after the image data corresponding to the area 70 stored in the storage means 55-3. The blank data is the one inserted in case where nothing is displayed. In compliance with a type of the image data, there is not always necessary to insert data.

If the area 60 is deleted according to the above processing, the area 60 displays nothing. This function is valid where a specific electronic paper is detached and handed over to the other user.

And when the succeeding character data is moved to the deleted area 60, the editing means 65 places the character data corresponding to the area 71 (the area M71 in FIG. 26(*b*)) after the character data corresponding to the area 70 (the area M70 in FIG. 26(*b*)) stored in the storage means 55-2. Thereby, the character data corresponding to the area 71 (the area M71 in FIG. 26(*b*)) moves to the upper part.

Next, the editing means 65 copies (deletes) the character data as much as the character data corresponding to the deleted area 60 from the top of the character storage means 56-2 of the electronic paper 56, and then adds said data to the rear of the character data (the area M72 in FIG. 26(*b*)) stored in the character storage means 55-2 of the electronic paper 55.

According to the above processing, in the character storage 55-2 of the electronic paper 55, the character data corresponding to the area 60 (the area M60 in FIG. 26(*b*)) is deleted and then the consecutive character data (the area M72 in FIG. 26(*b*)) is added from the other electronic paper.

Likewise, in the character storage means 56-2 of the electronic paper 56, the same processing is performed regarding the deleted area (area M72 in FIG. 26(*b*)), thereby the character storage means is updated in a plurality of electronic paper. In addition, the same processing is performed on the image data; thereby the image data can be moved.

After the contents of respective character storage means 42 and image storage means 43 are updated, the display light control means 23 sends to the display driver 122 respective contents of the character storage means 42 and the image storage means 43 together with the position data in order to reflect the updated contents on the displaying.

According to the above configuration, it is possible to move the succeeding character data and image data to the deleted area 60, and perform such processing on a plurality of electronic papers. And it is possible to make the processing easy. For instance, the cover 102 is provided with the character storage means 42 and the image storage means 43. Regarding these storages the moving (editing) is performed. And then the displaying on the electronic paper is to be updated. Thereby there is no need to execute the moving for the independent storage means in each electronic paper.

In case of editing data in the memory card 41 in direct, it is also possible to make the processing easy. However, in this case, when the electronic paper is detached, the character data and the image data are lost due to no independent storage means per electronic paper.

Besides, since the delete processing of the character data is separated from that of the image data (that is to say, the function is provided to individual), it is possible to delete only either of the character data or the image data.

Figure 28A:
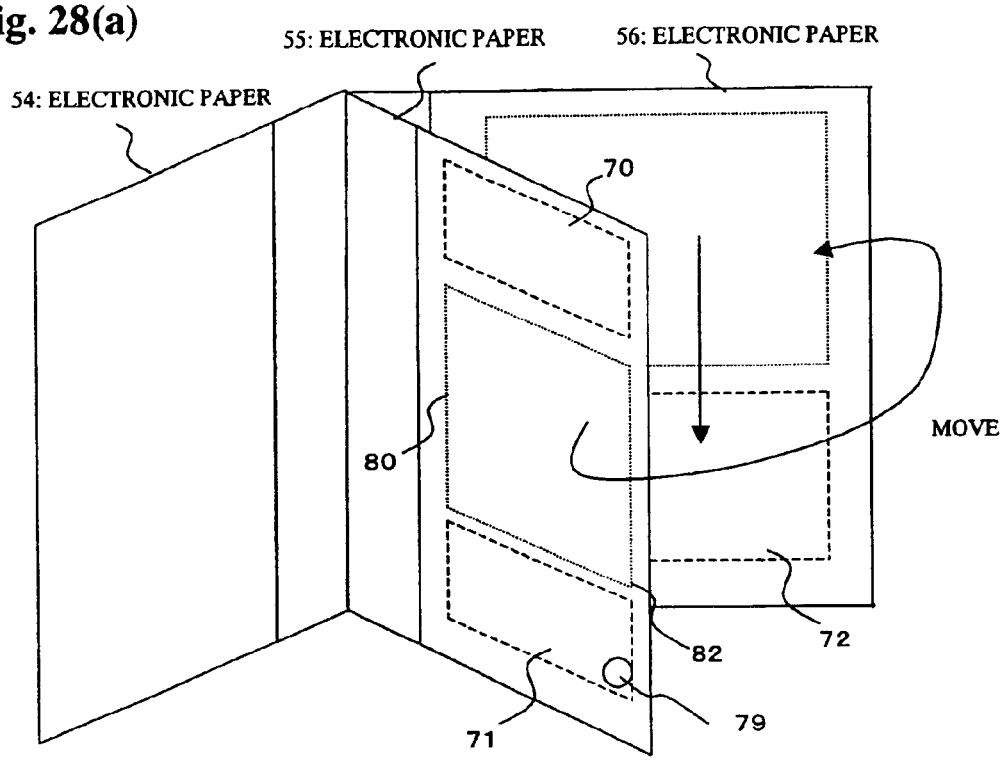
FIG. 28 is a diagram showing an example of the moving of an electronic paper file of the invention.
Figure 28B:
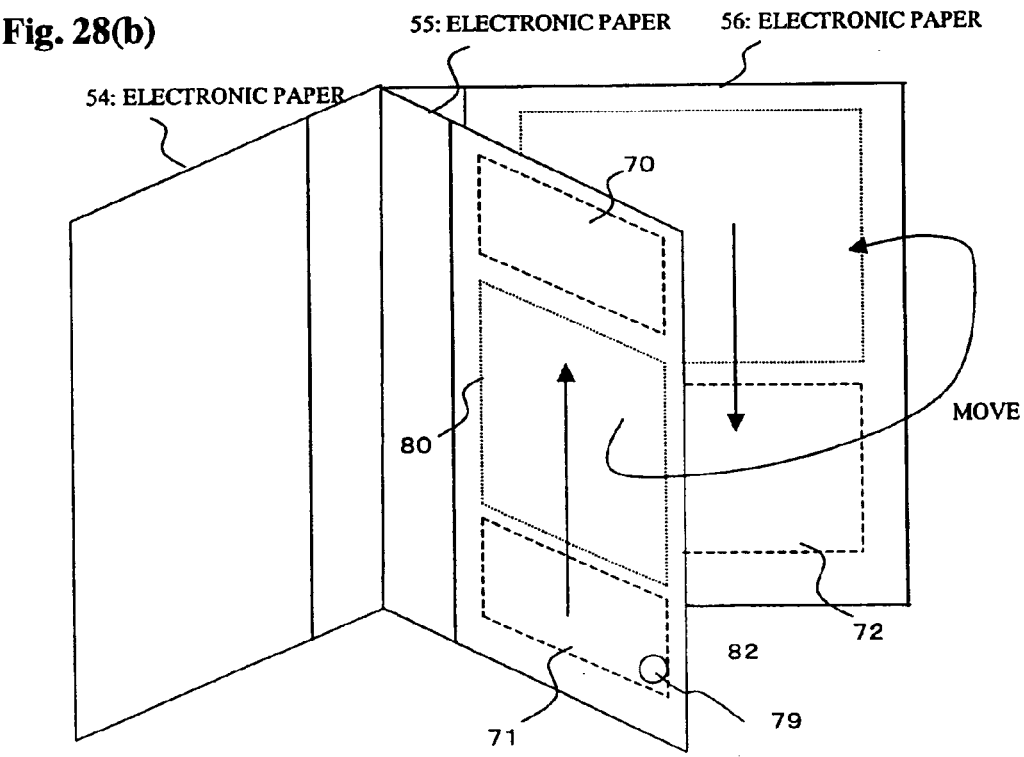

According to FIG. 25, FIG. 27(*a*), FIG. 27(*b*), FIG. 28 (*a*) and FIG. 28(*b*), the moving (editing) of the character data and the image data on the electronic paper is explained here.

FIG. 27(*a*) shows the electronic paper file 100 simply. The electronic paper file 100 is also provided with three sheets of electronic papers 54 to 56. Like the delete processing, the respective display units display the character data and the image data corresponding to the consecutive pages. It is assumed that a page feed code 79, which represents turning the page of the character data and the image data, is inserted to the end of the electronic paper 55. FIG. 27(*b*) is an image diagram of the inside of the character storage means 56-2 shown in the FIG. 27(*a*).

The user specifies the area 80 of the character data to be moved. The specifying is carried out by pushing the point 81 of the upper left of the area 80 and the point 82 of the lower right of the area 80 like the above delete processing, thereby the position data of pixels at the points 81 and 82 is sent to the display light control means 23.

The display light control means 23, at the time of recognizing the area 80, refers to the character storage means 55-2 corresponding to the area 80, and obtains the character data included in the area 80.

Next, if the user select "move" from the editing menu displayed on the electronic paper 55, the editing means 65 comprising the display light control means 23 deletes the character data corresponding to the area 80 from the character storage means 55-2. Though the character data is deleted from the character storage means 55-2, the data is stored temporarily in a working memory not shown in the drawings. As the working memory, it may use the one provided in the cover 102 or the electronic paper 101, or the unoccupied area in the character storage means 54-2 to 56-2, or the image storage means 54-3 to 56-3.

According to the above procedure, the character data corresponding to the area 80 in the character storage 55-2 is deleted. Like the delete processing, there are two cases that the deleted area 80 is left as a blank space or that the succeeding character data is moved to the deleted area 80, after the deleting. In the embodiment, the user can select one from the above two cases, and according to the selected content the processing is executed in the same way as the above deleting.

Accordingly, the character data corresponding to the area 80 is deleted from the character storage means 55-2, and stored temporarily in the working memory.

Next, the user specifies the position of his desired destination by means of the writing material. The specified position is sent to the display light control means 23 from the transmissive sheet 44.

When the user selects "paste" from the menu, the editing means 65 reads out the character data corresponding to the area 80 stored in the working memory, and then pastes the data on the character storage means (56-2) corresponding to the position (area) specified by the writing material. The character storage means 56-2 at the pasting is illustrated as an image diagram in FIG. 27(*b*).

Regarding the character data M72 and M73 corresponding to the specific area before pasting, in case where the character data M80 corresponding to the area 80 is inserted to the top of the character storage means 56-2, the character data M80 is inserted to the upper part of the character data M72, thereby the character data M72 is placed under the character data M80. The character data M73 in size as much as the character data 80 is deleted from the character storage means 56-2. However, if there is an electronic paper for displaying the succeeding page, the character data M73 should be moved to the top of the character storage area of the electronic paper like the above processing.

The same as the processing for the character data is performed on the image data, thereby the moving of the character data and the image data on each storage means is completed. After the moving on each storage means was completed, the editing means 65 sends the information to the display light control means 23.

The display light control means 23 performs the specific processing on the display-data stored in each storage means, and sends the data to the display driver 121 as the bit data for displaying as described above. After that, the data is displayed on the electronic paper like the case when the image data is received from the sending-receiving means 104. However, it may be arranged so that the user can determine whether the deleting and the moving are reflected on the memory card 41 or not.

On the basis of the above processing, the moving of area can be carried out by the following two methods. That is to say, in case where the area 80 after the moving is displayed in the state of blank space, as keeping the position of the area 71 on the electronic paper 55, the displaying of the area 80 moves to the upper side of the electronic paper 56, and the area that was placed on the upper side of the electronic paper 55 moves under the area 80, as shown in FIG. 28(*a*).

In case where the succeeding character data and image data moves to a trace of the object area 80, the area 71 on the electronic paper 55 is positioned just under the area 70 and the page is turned by the page feed code 79 at the end, as shown in FIG. 28(*b*). Meanwhile, the display of the area 80 moves to the upper side on the electronic paper 56, but the area 72 placed on the upper side on the electronic paper 56 moves under the area 80.

Besides, if it is configured so as not to delete the trace of display-data to be moved, it is needless to say that the data in a specific area can be copied.

When the electronic papers can display receptive display-data different each other, if the electronic paper is provided with a function in which, for instance, the electronic paper A connected with one cover displays the first page and the electronic paper B display the hundredth page, it is possible to make the moving easy by displaying on the physically different pages the display-data to be moved and the display-data to which the data moves. Moreover, if the electronic paper can display on both sides, the display-data to be moved and the display-data to which the data moves can be displayed on the double-spread left and right pages. Therefore it is easier to move. The both-sides displaying can be carried out by pasting backsides of two electronic papers each other.

As described above, the invention in this embodiment can edit the content displayed on a specific electronic paper in direct such as the inputting, the deleting, and the moving. According to this editing, the content on the other pages can be changed automatically. Therefore, it is needless to say that the user can perform the editing so as to keep the familiar sense of sight and feeling like writing into a notebook.

By displaying a reference page and a page for the editing on a plurality of electronic papers (double-spread pages or consecutive pages, for example), it is possible to make the editing easier than before.

Besides, the rotatable configuration of the movable axis part 50 is not explained particularly, but even in case of adopting such configuration, it is needless to say that the editing function explained in the embodiment can be carried out.

What is claimed is:

1. An electronic paper file composed of an electronic paper of a flexible display medium and a cover to which a plurality of electronic papers can be attached, comprising:

first storage means for storing display-data to be displayed on the electronic paper;

page selecting means for selecting a desired page of the display data;

state detecting means for detecting whether the electronic paper is attached or detached to or from the cover;

number-of-pages recognizing means for recognizing the number of the electronic papers attached to the cover in accordance with the detected result; and first display control means for obtaining from the first storage means the display-data corresponding to the number of the attached electronic papers and displaying said data on the electronic paper, the display-data comprising consecutive pages having the desired page as a first page.

2. The electronic paper file according to claim 1, wherein the electronic paper can be attached or detached to or from the cover by providing one of a pair of connecting terminals on one end of the display unit of the electronic paper and another connecting terminal on the cover, said connecting terminals comprising of the physical and electric connecting function.

3. The electronic paper file according to claim 2, wherein the arrangement order of the other connecting terminals on the cover is fixed.

4. The electronic paper file according to claim 2, further comprising a connecting unit on the cover in which a plurality of movable axis parts are disposed in the direction of the axis so as to be rotatable freely, said plurality of movable axis parts comprising the other connecting terminal.

5. The electronic paper file according to claim 2, further comprising position detecting means for detecting a rotated position of the other connecting terminal.

6. The electronic paper file according to claim 5, wherein the state detecting means imparts a connecting order ID number to the connecting terminal for identifying the connecting order of the connecting terminal according to either one of the state of the electronic paper or the rotated position of the connecting terminal.

7. The electronic paper file according to claim 5, wherein the first display control means displays the display-data according to the connecting order ID number imparted by the state detecting means.

8. The electronic paper file according to claim 1, wherein the page selecting means comprises page feed means for moving the display-data displayed on the display unit of the electronic paper forward or backward specific pages.

9. The electronic paper file according to claim 1, wherein the state detecting means starts up when the electronic paper is attached or detached to or from the other connecting terminal, when the electronic paper file is powered on, when the displaying of the electronic paper is reset, or when the page feed means starts up.

10. The electronic paper file according to claim 2, wherein one of the connecting terminals comprises parallel reeds provided in parallel on the end of the electronic paper, while the other of the connecting terminals comprises a holding plate holding the electronic paper from both sides of the electronic paper and derivation reeds provided inside of the holding plate.

11. The electronic paper file according to claim 1, wherein the page selecting means comprises display selecting means for allowing either one of the plural electronic pages display the desired display-data.

12. The electronic paper file according to claim 1, wherein the electronic paper is provided with the page selecting means on a specific position.

13. The electronic paper file according to claim 1, wherein the electronic paper is provided with the page selecting means at the end of the display unit.

14. The electronic paper file according to claim 1, wherein the electronic paper is provided with the page selecting means on a backside.

15. The electronic paper file according to claim 1, further comprising page number display means for displaying a page number selected by the page selecting means.

16. The electronic paper file according to claim 15, wherein the page number display means is provided at a specific position of the electronic paper.

17. The electronic paper file according to claim 1, wherein the page selecting means can perform the remote control of the electronic paper file.

18. The electronic paper file according to claim 1, wherein the page selecting means can perform the remote control of the electronic paper.

19. The electronic paper file according to claim 1, wherein the page selecting means selects a desired page by means of soft keyboard displayed on the display unit.

20. The electronic paper file according to claim 1, wherein the display unit comprises a digitizer function.

21. The electronic paper file according to claim 1, wherein the electronic paper comprises second storage means for storing specific display-data.

22. The electronic paper file according to claim 21, wherein the electronic paper comprises sending-receiving means for obtaining specific display-data from a specific storage medium and inputting the specific display-data in the second storage means.

23. The electronic paper file according to claim 1, wherein the cover comprises electronic paper detecting means for detecting an electronic paper within a specific range from the cover.

24. The electronic paper file according to claim 21, wherein the second storage means stores an ID number for specifying an electronic paper.

25. The electronic paper file according to claim 24, wherein the cover comprises number imparting means for imparting an electronic paper number to an electronic paper for identifying with a destination of a specific page of the display-data on the basis of the ID number identifying with an electronic paper.

26. The electronic paper file according to claim 21, wherein the cover comprises first display control means for obtaining display-data corresponding to a page selected by the page selecting means from the first storage means or the second storage means and then displaying the data on the electronic paper.

27. The electronic paper file according to claim 21, wherein the electronic paper comprises second display control means for obtaining display-data corresponding to a page selected by the page selecting means from the first storage means or the second storage means and then displaying the data on the electronic paper.

28. The electronic paper file according to claim 22, wherein the sending-receiving means of the cover and the sending-receiving means of the electronic paper mutually send and receive the display-data stored in the first storage means and the second storage means.

29. The electronic paper file according to claim 22, wherein the sending-receiving means receives the display-data through the Internet.

30. The electronic paper file according to claim 1, further comprising:
    position selecting means for selecting a specific position or area on the electronic paper;
    editing means for editing the display-data corresponding to the selected position or area and updating the display-data displayed on a different electronic paper and relevant to the editing; and
    display light control means for displaying the display-data edited by the editing means on the electronic paper.

31. The electronic paper file according to claim 30, wherein the display-data is stored in storage means provided on each electronic paper.

32. The electronic paper file according to claim 31, wherein the display-data comprises character data and image data, and the storage means manages the character data and the image data so as to be able to edit respective data separately.

33. The electronic paper file according to claim 30 or claim 31, wherein the editing is to delete the display-data corresponding to the selected area, and the editing means moves the display-data placed at the rear of the deleted display-data toward the area on which the deleted display-data has been displayed.

34. The electronic paper file according to claim 30 or claim 31, wherein the editing is to delete the display-data corresponding to the selected area, and the editing means retains the area that the deleted display-data has been displayed.

35. The electronic paper file according to claim 30 or claim 31, wherein the editing is to move the display-data corresponding to the selected area, and the editing means moves to the area to be an object of moving display-data placed at the rear of the display-data to be the object of moving.

36. The electronic paper file according to claim 30 or claim 31, wherein the editing is to move the display-data corresponding to the selected area, and the editing means retains the area to be an object of moving.

37. The electronic paper file according either one of claims 30 or 31, wherein the electronic paper is attachable or detachable to or from the cover.

38. The electronic paper file according to claim 30, wherein the electronic paper can be attached or detached to or from the cover by providing one of a pair of connecting terminals at one end of the display unit of the electronic paper and another connecting terminal to the cover, said connecting terminal comprising the physical and electric connecting function.

39. The electronic paper file according to claim 38, wherein the arrangement order of the other connecting terminals on the cover is fixed.

40. The electronic paper file according to claim 38, further comprising a connecting unit on the cover in which a plurality of movable axis parts are disposed in the direction of axis so as to be rotatable freely, said plurality of movable axis parts comprising the other connecting terminals.

41. The electronic paper file according to claim 38, further comprising state detecting means for detecting whether the electronic paper is attached or detached to or from the other connecting terminal.

42. The electronic paper file according to claim 38, further comprising position detecting means for detecting a rotated position of the connecting terminal of the cover.

43. The electronic paper file according to claim 41 or claim 42, wherein the state detecting means imparts a connecting order ID number to a connecting terminal for identifying with the connecting order of the connecting terminal according to either one of the state of the electronic paper or the rotated position of the other connecting terminal.

44. The electronic paper file according to claim 43, wherein the display light control means performs the display processing of the display-data on the basis of the connecting order ID number imparted by the state detecting means.

45. The electronic paper file according to claim 2, wherein the first display control means prohibits transferring the display data to the connecting terminal to which the electronic paper is not attached.

46. The electronic paper file according to claim 8, wherein the specific pages are forwarded or backed one by one.

47. The electronic paper file according to claim 8, wherein the specific pages are forwarded or backed in a unit of the number of attached electronic papers.

48. The electronic paper file according to claim 8, wherein the specific pages are forwarded or backed in a unit of the selected number of pages.

* * * * *